United States Patent
Yoshida et al.

(10) Patent No.: US 9,514,693 B2
(45) Date of Patent: Dec. 6, 2016

(54) LIQUID CRYSTAL DISPLAY DEVICE

(71) Applicant: Sharp Kabushiki Kaisha, Osaka-shi, Osaka (JP)

(72) Inventors: Takehisa Yoshida, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 14/427,314

(22) PCT Filed: Sep. 5, 2013

(86) PCT No.: PCT/JP2013/073971
§ 371 (c)(1),
(2) Date: Mar. 11, 2015

(87) PCT Pub. No.: WO2014/042074
PCT Pub. Date: Mar. 20, 2014

(65) Prior Publication Data
US 2015/0221266 A1   Aug. 6, 2015

(30) Foreign Application Priority Data
Sep. 13, 2012   (JP) .................................. 2012-201916

(51) Int. Cl.
*G09G 5/02* (2006.01)
*G09G 3/36* (2006.01)
(Continued)

(52) U.S. Cl.
CPC ....... *G09G 3/3607* (2013.01); *G02F 1/136259* (2013.01); *G09G 3/2074* (2013.01); *G09G 3/36* (2013.01); *G09G 3/3659* (2013.01); *G09G 3/3685* (2013.01); *G02F 2001/136272* (2013.01); *G09G 3/3614* (2013.01); *G09G 2300/0413* (2013.01); *G09G 2300/0447* (2013.01); *G09G 2300/0804* (2013.01); *G09G 2300/0819* (2013.01); *G09G 2320/028* (2013.01); *G09G 2320/0223* (2013.01);
(Continued)

(58) Field of Classification Search
CPC ........ G09G 3/36; G09G 3/20; G09G 3/3685; G09G 3/3659; G09G 3/3607; G09G 3/2074; G09G 3/3614
USPC .................................................. 345/89, 694
See application file for complete search history.

(56) References Cited

U.S. PATENT DOCUMENTS

| 5,268,678 A | 12/1993 | Nakazawa et al. |
| 6,958,791 B2 | 10/2005 | Shimoshikiryo |

(Continued)

FOREIGN PATENT DOCUMENTS

| JP | 03-023425 A | 1/1991 |
| JP | 05-005896 A | 1/1993 |

(Continued)

*Primary Examiner* — Vijay Shankar
(74) *Attorney, Agent, or Firm* — Keating & Bennett, LLP

(57) ABSTRACT

When a first source bus line (SA) or a second source bus line (SB) which is associated with a pixel of one column is electrically connected with a spare wire (AL1), a control circuit (15B) of a liquid crystal display device (100B) according to an embodiment of the present invention is capable of controlling the amplitudes of the oscillation of a first display signal voltage and a second display signal voltage output to the first source bus line (SA) and the second source bus line (SB) so as to be smaller than that achieved when the first source bus line (SA) or the second source bus line (SB) is not electrically connected with the spare wire (AL1).

10 Claims, 21 Drawing Sheets

(51) Int. Cl.
*G02F 1/1362* (2006.01)
*G09G 3/20* (2006.01)

(52) U.S. Cl.
CPC ............... *G09G2320/0233* (2013.01); *G09G 2320/0626* (2013.01); *G09G 2330/08* (2013.01); *G09G 2360/144* (2013.01)

(56) References Cited

U.S. PATENT DOCUMENTS

| | | | |
|---|---|---|---|
| 8,159,432 B2 | 4/2012 | Naruse et al. | |
| 8,537,329 B2* | 9/2013 | Chen | G02F 1/136259 345/93 |
| 8,570,351 B2* | 10/2013 | Mori | G09G 3/3607 345/690 |
| 8,669,556 B2* | 3/2014 | Yamazaki | H01L 29/7869 257/43 |
| 9,047,836 B2* | 6/2015 | Koyama | G09G 3/3648 |
| 2009/0189881 A1 | 7/2009 | Ooishi et al. | |
| 2011/0157128 A1 | 6/2011 | Koyama | |
| 2011/0254759 A1 | 10/2011 | Mori et al. | |
| 2012/0138922 A1 | 6/2012 | Yamazaki et al. | |
| 2012/0147311 A1 | 6/2012 | Chen et al. | |

FOREIGN PATENT DOCUMENTS

| | | |
|---|---|---|
| JP | 2004-062146 A | 2/2004 |
| JP | 2009-175468 A | 8/2009 |
| JP | 2010-271413 A | 12/2010 |
| JP | 2011-150322 A | 8/2011 |
| JP | 2012-134475 A | 7/2012 |
| KR | 10-2011-0096176 A | 8/2011 |
| WO | 2007/034876 A1 | 3/2007 |

* cited by examiner (a)

| | R | G | B |
|---|---|---|---|
| BRIGHT | 180 | 120 | 80 |
| DARK | 180 | 120 | 80 |

(b)

(c)

Δu'v'=0.057

| | | R | G | B |
|---|---|---|---|---|
| NORMALIZED LUMINANCE | FRONT | 0.375 | 0.150 | 0.055 |
| | OBLIQUE 60° | 0.554 | 0.440 | 0.309 |
| VIEWING ANGLE LUMINANCE RATIO (OBLIQUE/FRONT) | | 1.48 | 2.94 | 5.65 |
| RGB LUMINANCE RATIO (RELATIVE TO HIGHEST GRAYSCALE LEVEL COLOR) | FRONT | 1.00 | 0.40 | 0.15 |
| | OBLIQUE 60° | 1.00 | 0.79 | 0.56 |
| RGB LUMINANCE RATIO VARIATION (OBLIQUE-FRONT) | | 0.00 | 0.39 | 0.41 |

(a)

| | R | G | B |
|---|---|---|---|
| BRIGHT | 232 | 157 | 104 |
| DARK | 0 | 0 | 0 |

(b)

B: BRIGHT
D: DARK (c)

Δu'v'=0.056

| | | R | G | B |
|---|---|---|---|---|
| NORMALIZED LUMINANCE | FRONT | 0.375 | 0.150 | 0.056 |
| | OBLIQUE 60° | 0.367 | 0.265 | 0.201 |
| VIEWING ANGLE LUMINANCE RATIO (OBLIQUE/FRONT) | | 0.98 | 1.76 | 3.63 |
| RGB LUMINANCE RATIO (RELATIVE TO HIGHEST GRAYSCALE LEVEL COLOR) | FRONT | 1.00 | 0.40 | 0.15 |
| | OBLIQUE 60° | 1.00 | 0.72 | 0.55 |
| RGB LUMINANCE RATIO VARIATION (OBLIQUE-FRONT) | | 0.00 | 0.32 | 0.40 |

(a)

|  | R | G | B |
|---|---|---|---|
| BRIGHT | 180 | 157 | 104 |
| DARK | 180 | 0 | 0 |

(b)

B: BRIGHT
D: DARK (c)

Δu'v'=0.034

|  |  | R | G | B |
|---|---|---|---|---|
| NORMALIZED LUMINANCE | FRONT | 0.375 | 0.150 | 0.056 |
|  | OBLIQUE 60° | 0.554 | 0.265 | 0.201 |
| VIEWING ANGLE LUMINANCE RATIO (OBLIQUE/FRONT) |  | 1.48 | 1.76 | 3.63 |
| RGB LUMINANCE RATIO (RELATIVE TO HIGHEST GRAYSCALE LEVEL COLOR) | FRONT | 1.00 | 0.40 | 0.15 |
|  | OBLIQUE 60° | 1.00 | 0.48 | 0.36 |
| RGB LUMINANCE RATIO VARIATION (OBLIQUE-FRONT) |  | 0.00 | 0.08 | 0.22 |

B: BRIGHT
D: DARK

B: BRIGHT
D: DARK

| R 0 | G | | | | | | | |
|---|---|---|---|---|---|---|---|---|
| | 0 | 1 | 2 | 3 | 4 | | 120 | 255 |
| B 0 | | | | | | | | |
| 1 | | | | | | | | |
| 2 | | | | | | | | |
| 3 | | | | | | | | |
| 4 | | | | | | | | |
| 80 | | | | | | | | |
| 255 | | | | | | | | |

(b)

| R 180 | G | | | | | | | |
|---|---|---|---|---|---|---|---|---|
| | 0 | 1 | 2 | 3 | 4 | | 120 | 255 |
| B 0 | | | | | | | | |
| 1 | | | | | | | | |
| 2 | | | | | | | | |
| 3 | | | | | | | | |
| 4 | | | | | | | | |
| 80 | | | | | | | | |
| 255 | | | | | | | | |

| | BRIGHT | DARK |
|---|---|---|
| G | 157 | 0 |
| B | 104 | 0 |

(c)

| R 255 | G | | | | | | | |
|---|---|---|---|---|---|---|---|---|
| | 0 | 1 | 2 | 3 | 4 | | 120 | 255 |
| B 0 | | | | | | | | |
| 1 | | | | | | | | |
| 2 | | | | | | | | |
| 3 | | | | | | | | |
| 4 | | | | | | | | |
| 80 | | | | | | | | |
| 255 | | | | | | | | |

FIG.12

| INPUT GRAYSCALE LEVEL | | | OUTPUT GRAYSCALE LEVEL | | | | | |
|---|---|---|---|---|---|---|---|---|
| R | G | B | R | | G | | B | |
| | | | BRIGHT | DARK | BRIGHT | DARK | BRIGHT | DARK |
| 0 | 0 | 0 | | | | | | |
| ⋮ | ⋮ | ⋮ | | | | | | |
| 0 | 0 | 255 | | | | | | |
| ⋮ | ⋮ | ⋮ | | | | | | |
| 0 | 255 | 255 | | | | | | |
| ⋮ | ⋮ | ⋮ | | | | | | |
| 135 | 135 | 135 | 176 | 0 | 135 | 135 | 135 | 135 |
| ⋮ | ⋮ | ⋮ | | | | | | |
| 180 | 120 | 80 | 180 | 180 | 157 | 0 | 104 | 0 |
| ⋮ | ⋮ | ⋮ | | | | | | |
| 255 | 255 | 255 | | | | | | |

(EXAMPLE rows: 135,135,135 and 180,120,80)

FIG.13

| INPUT GRAYSCALE LEVEL | | | OUTPUT GRAYSCALE LEVEL | | | | | | | |
|---|---|---|---|---|---|---|---|---|---|---|
| R | G | B | R | | G | | B | | Ye | |
| | | | BRIGHT | DARK | BRIGHT | DARK | BRIGHT | DARK | BRIGHT | DARK |
| 0 | 0 | 0 | | | | | | | | |
| ⋮ | ⋮ | ⋮ | | | | | | | | |
| 0 | 0 | 255 | | | | | | | | |
| ⋮ | ⋮ | ⋮ | | | | | | | | |
| 0 | 255 | 255 | | | | | | | | |
| ⋮ | ⋮ | ⋮ | | | | | | | | |
| 255 | 255 | 255 | | | | | | | | |

FIG.16
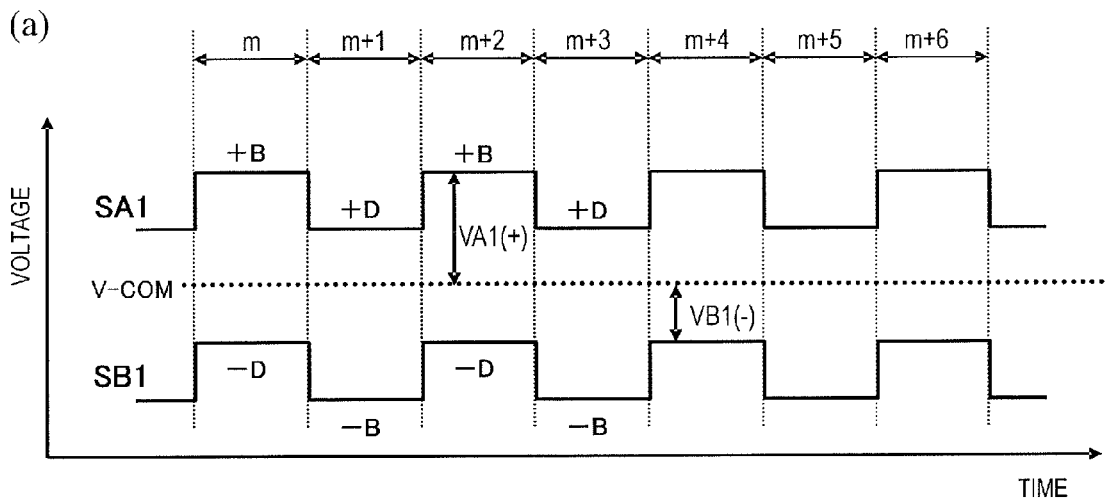
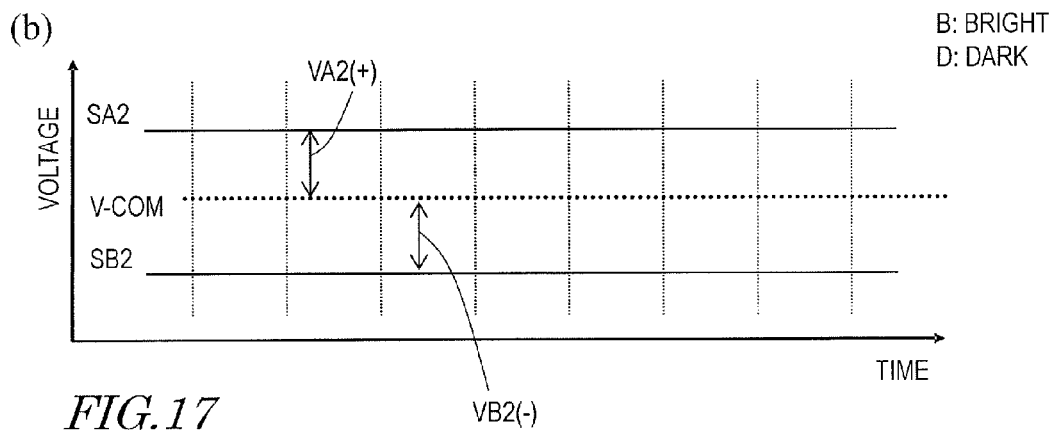
B: BRIGHT
D: DARK
FIG.17
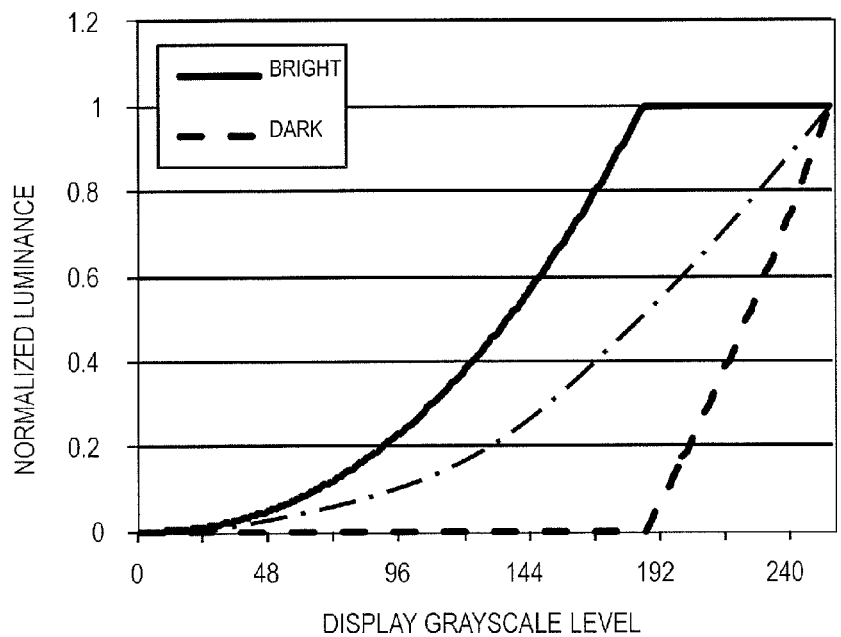

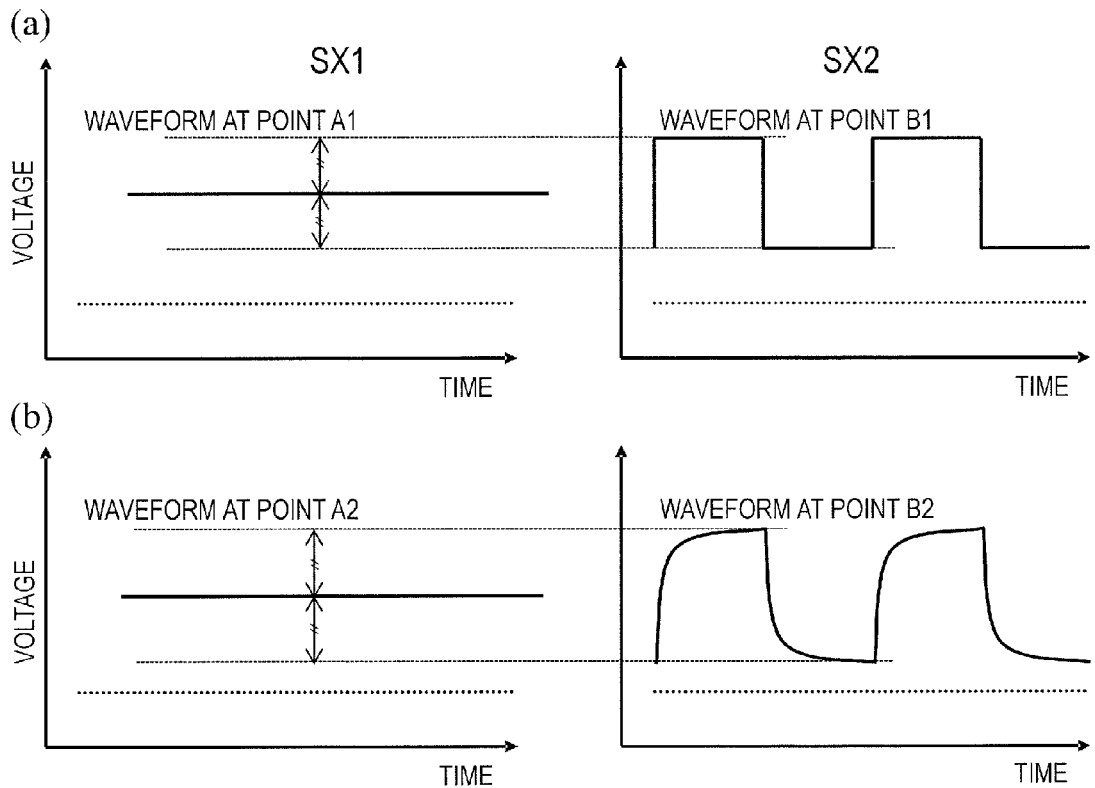

LIQUID CRYSTAL DISPLAY DEVICE

TECHNICAL FIELD

The present invention relates to a liquid crystal display device, and particularly to a liquid crystal display device which has excellent viewing angle characteristics.

BACKGROUND ART

Recently, vertical alignment mode (VA mode) liquid crystal display devices and transverse electric field mode liquid crystal display devices (including IPS mode devices and FFS mode devices) are used as liquid crystal display devices for TV applications and the like. Note that the transverse electric field mode is sometimes referred to as "IPS mode".

Of the above device types, the VA mode liquid crystal display device exhibits a large viewing angle dependence of the γ characteristic as compared with the IPS mode liquid crystal display device. The γ characteristic is an input grayscale level vs. luminance characteristic. In general, the viewing direction (i.e., viewing angle) is expressed by the angle with the normal to the display surface (polar angle) and the azimuthal angle that represents the azimuth in the display surface. The γ characteristic of the VA mode liquid crystal display device particularly has a large dependence on the polar angle of the viewing direction. That is, the γ characteristic that is acquired when viewed from the front (in a direction normal to the display surface) and the γ characteristic that is acquired when viewed in an oblique direction are different from each other, and therefore, the grayscale display state varies depending on the viewing direction (polar angle).

To reduce the viewing angle dependence of the γ characteristic in the VA mode liquid crystal display device, a liquid crystal display device having a multi-pixel configuration such as disclosed in Patent Document 1 of the present applicant, for example, has been put to practical use. The multi-pixel configuration refers to a configuration in which one pixel includes a plurality of sub-pixels of different brightnesses. Note that, in this specification, the "pixel" refers to the minimum unit of display in the liquid crystal display device. In the case of a color liquid crystal display device, the "pixel" refers to the minimum unit of display of each primary color (typically, R, G, or B) and is sometimes referred to as "dot".

Each of the pixels of a liquid crystal display device having a multi-pixel configuration includes a plurality of sub-pixels among which different voltages can be applied across the liquid crystal layer. For example, when a pixel displays at least an intermediate grayscale level, the pixel includes two sub-pixels which exhibit different luminances. When two sub-pixels constitute one pixel, the luminance of one of the two sub-pixels is higher than a luminance that the pixel is to display (bright sub-pixel), and the luminance of the other sub-pixel is lower than the luminance that the pixel is to display (dark sub-pixel).

The multi-pixel configuration is also referred to as "pixel-divided configuration", and various types thereof have been known. For example, each of the pixels of a liquid crystal display device shown in FIG. 1 of Patent Document 1 includes two sub-pixels, and different display signal voltages are supplied to the two sub-pixels via two source bus lines (display signal lines) respectively corresponding to the two sub-pixels. Here, this type is referred to as "source direct multi-pixel type".

On the other hand, in a liquid crystal display device shown in FIG. 12 of Patent Document 1, two sub-pixels of each pixel are supplied with equal display signal voltages. Here, as shown in FIG. 12, each sub-pixel has a storage capacitance, and a storage capacitance counter electrode (connected to the CS bus line) which forms the storage capacitance is electrically independent in each sub-pixel. The voltage supplied to the storage capacitance counter electrode ("storage capacitance counter voltage") is changed after the TFT is switched from ON to OFF, whereby effective voltages applied across the liquid crystal layer of the two sub-pixels are made different from each other with the utilization of capacitance dividing. Here, this type is referred to as "CS swing type". The CS swing type has such an advantage that the number of source bus lines can be reduced as compared with the source direct type. In the case where each pixel includes two sub-pixels as illustrated, in the CS swing type, the number of signal lines can be halved as compared with the source direct type.

CITATION LIST

Patent Literature

Patent Document 1: Japanese Laid-Open Patent Publication No. 2004-62146 (Specification of U.S. Pat. No. 6,958,791)

Patent Document 2: WO 2007/034876 (Specification of U.S. Pat. No. 8,159,432)

Patent Document 3: Japanese Laid-Open Patent Publication No. 3-23425 (Specification of U.S. Pat. No. 5,268,678)

SUMMARY OF INVENTION

Technical Problem

Using the above-described multi-pixel configuration enables improving the viewing angle (particularly, polar angle) dependence of the γ characteristic of a liquid crystal display device (particularly, VA mode liquid crystal display device). However, for example, as will be described later, there is such a problem that even when the viewing angle dependence of the γ characteristic is improved by conventional multi-pixel driving, the viewing angle dependence of the color reproducibility cannot be sufficiently reduced.

Patent Document 2 of the present applicant discloses a liquid crystal display device in which, for the purpose of reducing the viewing angle dependence of the color reproducibility, the area ratio and/or lighting time of the bright sub-pixel in each of the primary color pixels (typically, red (R) pixel, green (G) pixel and blue (B) pixel) is adjusted so as to reduce the viewing angle dependence of the color reproducibility of a human skin color (hereinafter, "skin color").

However, the liquid crystal display device disclosed in Patent Document 2 has such a problem that the colors of which the viewing angle dependence of the color reproducibility can be improved are limited or the driving method becomes complicated.

According to the researches carried out by the present inventors, from the viewpoint of reducing the viewing angle dependence of the color reproducibility, the source direct multi-pixel type is advantageous because the flexibility of combination of display signal voltages which are to be supplied to two or more sub-pixels included in a pixel is high.

On the other hand, a liquid crystal display device of the source direct multi-pixel type has a problem of poor mass productivity. This is attributed to a fact that, for example, a method disclosed in Patent Document 3 which uses spare wires cannot substantially repair disconnection of a source bus line.

The present invention was conceived for the purpose of solving at least one of the above-described problems. The objects of the present invention include providing a liquid crystal display device of the source direct multi-pixel type which is capable of repairing disconnection of a source bus line and/or providing a liquid crystal display device having a multi-pixel configuration which is capable of reducing the viewing angle dependence of the color reproducibility.

Solution to Problem

A liquid crystal display device according to an embodiment of the present invention includes: a plurality of pixels arranged in a matrix of rows and columns, each of the plurality of pixels including a first sub-pixel and a second sub-pixel; a first TFT and a second TFT which are associated with each of the plurality of pixels; a first source bus line connected to the first sub-pixel via the first TFT and a second source bus line connected to the second sub-pixel via the second TFT; a spare wire which is electrically connectable with the first source bus line and/or the second source bus line; and a control circuit configured to receive an input display signal that is indicative of grayscale levels which are to be exhibited by the plurality of pixels, generate a first display signal voltage and a second display signal voltage which are to be supplied to the first sub-pixel and the second sub-pixel of each of the plurality of pixels, and output the generated first and second display signal voltages to the first source bus line and the second source bus line, respectively, wherein when the first source bus line or the second source bus line which is associated with a pixel of one column is electrically connected with the spare wire, the control circuit is capable of controlling an amplitude of the oscillation of the first display signal voltage and the second display signal voltage output to the first source bus line and the second source bus line associated with the pixel of the one column so as to be smaller than that achieved when the first source bus line or the second source bus line associated with the pixel of the one column is not electrically connected with the spare wire. In this case, the amplitude of the oscillation of the first display signal voltage and the amplitude of the oscillation of the second display signal voltage are set so as to have equal absolute values, for example. As a matter of course, even when the first source bus line or the second source bus line is not electrically connected with the spare wire, the control circuit is also capable of changing (e.g., decreasing) the amplitude of the oscillation of the first display signal voltage and the second display signal voltage.

In one embodiment, when the first source bus line or the second source bus line which is associated with the pixel of the one column is electrically connected with the spare wire, the control circuit is capable of controlling the amplitude of the oscillation of the first display signal voltage and the second display signal voltage output to the first source bus line and the second source bus line associated with the pixel of the one column so as to be zero.

In one embodiment, the plurality of pixels form a plurality of color display pixels, each of the plurality of color display pixels including three or more pixels which exhibit different colors, and when the first source bus line or the second source bus line which is associated with the pixel of the one column is electrically connected with the spare wire, the control circuit is capable of changing the amplitude of the oscillation of the first display signal voltage or the second display signal voltage according to a color which is to be exhibited by the pixel of the one column.

In one embodiment, the plurality of pixels form a plurality of color display pixels, each of the plurality of color display pixels including three or more pixels which exhibit different colors, and the control circuit is capable of generating a first display signal voltage and a second display signal voltage that are to be supplied to the first sub-pixel and the second sub-pixel of an arbitrary one of the plurality of pixels based on a grayscale level to be exhibited by the arbitrary pixel and grayscale levels to be exhibited by two or more remaining pixels included in a color display pixel to which the arbitrary pixel belongs that are indicated by the input display signal, and outputting the generated first and second display signal voltages to the first source bus line and the second source bus line, respectively.

In one embodiment, for one grayscale level which is to be exhibited by the arbitrary pixel, the control circuit is capable of generating the first display signal voltage and the second display signal voltage that have two or more different absolute values according to the grayscale levels to be exhibited by the two or more remaining pixels. That is, even when the grayscale level exhibited by the first pixel is the same, the first display signal voltage and the second display signal voltage that are supplied to the first sub-pixel and the second sub-pixel of the first pixel can be controlled to have different absolute values according to the grayscale levels exhibited by the second pixel and the third pixel. For example, even when the grayscale level exhibited by the first pixel is the same, the grayscale level difference between sub-pixels of the first pixel can be varied between a case where the color exhibited by the color display pixel including the first, second and third pixels is a skin color and a case where the color exhibited by the color display pixel is an achromatic intermediate tone (gray).

In one embodiment, the first source bus line and the second source bus line extend in the column direction, in each of the plurality of pixels, the first sub-pixel and the second sub-pixel are arranged in the column direction, and a polarity of the first display signal voltage supplied from the first source bus line and a polarity of the second display signal voltage supplied from the second source bus line are each constant within a frame.

In one embodiment, the polarity of the first display signal voltage supplied from the first source bus line and the polarity of the second display signal voltage supplied from the second source bus line are opposite to each other in a frame.

In one embodiment, some of the plurality of pixels which are arranged in the column direction are to exhibit a same color, and two sub-pixels which belong to two pixels adjacent to each other in the column direction and which are electrically connected to the first source bus line are adjacent to each other in the column direction.

In one embodiment, an arbitrary one of the plurality of color display pixels includes m pixels, from the $1^{st}$ pixel to the $m^{th}$ pixel, where m is an integer which is not less than 3. The grayscale levels which are to be exhibited by the $1^{st}$ pixel to the $m^{th}$ pixel are the $1^{st}$ grayscale level GL1 to the $m^{th}$ grayscale level GLm. The luminances at the front viewing angle of the $1^{st}$ pixel to the $m^{th}$ pixel achieved when the $1^{st}$ pixel to the $m^{th}$ pixel exhibit the $1^{st}$ grayscale level GL1 to the $m^{th}$ grayscale level GLm which are normalized on the assumption that the luminance at the front viewing angle achieved when the highest grayscale level is exhibited is 1 are the $1^{st}$ frontal normalized luminance NL1 to the $m^{th}$ frontal normalized luminance NLm, respectively. The luminances at the oblique 60° viewing angle of the $1^{st}$ pixel to the $m^{th}$ pixel which are normalized on the assumption that the luminance at the oblique 60° viewing angle achieved when the highest grayscale level is exhibited is 1 are the 1st oblique viewing angle normalized luminance IL1 to the $m^{th}$ oblique viewing angle normalized luminance ILm, respectively. In this case, the control circuit is configured to generate the first display signal voltage and the second display signal voltage that are to be supplied to the first sub-pixel and the second sub-pixel of each of the $1^{st}$ pixel to the $m^{th}$ pixel such that the maximum value of the difference between the frontal luminance ratios between pixels which are obtained by normalizing the $1^{st}$ frontal normalized luminance NL1 to the $m^{th}$ frontal normalized luminance NLm with respect to the highest one of the $1^{st}$ frontal normalized luminance NL1 to the $m^{th}$ frontal normalized luminance NLm and the oblique 60° luminance ratios between pixels which are obtained by normalizing the $1^{st}$ oblique viewing angle normalized luminance IL1 to the $m^{th}$ oblique viewing angle normalized luminance ILm with respect to the highest one of the $1^{st}$ oblique viewing angle normalized luminance IL1 to the $m^{th}$ oblique viewing angle normalized luminance ILm is not more than 0.25.

In one embodiment, an arbitrary one of the plurality of color display pixels includes m pixels, from the $1^{st}$ pixel to the $m^{th}$ pixel, where m is an integer which is not less than 3. The grayscale levels which are to be exhibited by the $1^{st}$ pixel to the $m^{th}$ pixel are the $1^{st}$ grayscale level GL1 to the $m^{th}$ grayscale level GLm, respectively. The $1^{st}$ grayscale level GL1 to the $m^{th}$ grayscale level GLm include at least two different grayscale levels. In this case, the control circuit is configured to generate voltages which have equal absolute values as the first display signal voltage and the second display signal voltage respectively supplied to the first sub-pixel and the second sub-pixel of a pixel which is to exhibit a grayscale level of the largest value among the $1^{st}$ grayscale level GL1 to the $m^{th}$ grayscale level GLm.

In one embodiment, the control circuit is configured to generate the first display signal voltage and the second display signal voltage respectively supplied to the first sub-pixel and the second sub-pixel of each of the plurality of pixels exclusive of a pixel which exhibits the highest grayscale level among the m pixels included in the color display pixel such that the difference between the absolute values of the first display signal voltage and the second display signal voltage is the maximum.

For example, when the color exhibited by the color display pixel is a skin color, the relationship of "the grayscale level of the red pixel>the grayscale level of the green pixel>the grayscale level of the blue pixel" holds. Therefore, the grayscale level difference between sub-pixels of the red pixel is set to zero, while the grayscale level differences between sub-pixels of the green pixel and the blue pixel are each set to the maximum value.

When the color exhibited by the color display pixel is an achromatic intermediate tone, for example, the grayscale level differences between sub-pixels of the blue pixel and the green pixel are each set to zero, while the grayscale level difference between sub-pixels of the red pixel is set to the maximum value.

In one embodiment, each of the plurality of color display pixels includes a red pixel, a green pixel, and a blue pixel.

In one embodiment, each of the plurality of color display pixels further includes a yellow pixel. The color display pixel may include a white pixel instead of the yellow pixel. Further, each of the plurality of color display pixels may include a red pixel, a green pixel, a blue pixel, a cyan pixel, a magenta pixel, and a yellow pixel.

In one embodiment, the first TFT and the second TFT include a semiconductor oxide layer as an active layer. The semiconductor oxide layer includes IGZO.

Advantageous Effects of Invention

According to an embodiment of the present invention, a liquid crystal display device of the source direct multi-pixel type is provided which is capable of repairing disconnection. The liquid crystal display device of the embodiment of the present invention has a spare wire which is capable of electrically coupling a disconnected source bus line. A control circuit is capable of decreasing the amplitude of the oscillation of a display signal voltage that is to be supplied to the source bus line connected with the spare wire. Therefore, pixels connected to the disconnection-repaired source bus line can be made less visually perceivable.

According to another embodiment of the present invention, a liquid crystal display device having a multi-pixel configuration is provided which is capable of reducing the viewing angle dependence of the color reproducibility. The liquid crystal display device of the embodiment of the present invention has such a configuration that the amplitude of display signal voltages that are to be supplied to two sub-pixels included in each pixel can be arbitrarily controlled. In each pixel, the grayscale level difference between sub-pixels is controlled according to the color exhibited by the color display pixel. Therefore, the grayscale level difference between sub-pixels in each pixel can be controlled according to the color exhibited by the color display pixel such that the viewing angle dependence of the color reproducibility is reduced.

BRIEF DESCRIPTION OF DRAWINGS

FIG. 11 (a) to (c) show examples of a look-up table used for generation of display signal voltages supplied to two sub-pixels in a liquid crystal display device of an embodiment of the present invention.

FIG. 12 Another example of the look-up table used for generation of display signal voltages supplied to two sub-pixels in a liquid crystal display device of an embodiment of the present invention.

FIG. 13 Still another example of the look-up table used for generation of display signal voltages supplied to two sub-pixels in a liquid crystal display device of an embodiment of the present invention.

FIG. 16 (a) is a graph showing an example of the waveforms of the first display signal voltage SA1 output from a bright/dark division control circuit 20A to the first source bus line SA and the second display signal voltage SB1 output from the bright/dark division control circuit 20A to the second source bus line SB. (b) is a graph showing an example of the waveforms of the first display signal voltage SA2 output from a bright/dark division control circuit 20B to the first source bus line SA and the second display signal voltage SB2 output from the bright/dark division control circuit 20B to the second source bus line SB.

FIG. 17 A graph showing an example of the grayscale level vs. luminance characteristic achieved by a display signal voltage supplied to a disconnection-repaired source bus line.

FIGS. 20 (a) and (b) show the voltage waveforms at points A1 and A2 on the source bus line SX1 and at points B1 and B2 on the source bus line SX2 shown in FIG. 18 which are achieved when a display signal voltage which has a non-oscillatory waveform is supplied to the disconnection-repaired source bus line SX1.

FIG. 21 (a) is a chart showing a specific operation example of the bright/dark division control circuit 20A. (b) and (c) are charts showing specific operation examples of the bright/dark division control circuit 20B.

DESCRIPTION OF EMBODIMENTS

Hereinafter, a liquid crystal display device and a driving method thereof according to an embodiment of the present invention will be described with reference to the drawings. Note that the embodiment of the present invention is not limited to embodiments that will be described below.

Firstly, a liquid crystal display device of the source direct multi-pixel type which is capable of reducing the viewing angle dependence of the color reproducibility and a driving method thereof are described, and thereafter, a liquid crystal display device of the source direct multi-pixel type which is capable of repairing disconnection of a source bus line is described.

(Reduction of the Viewing Angle Dependence of the Color Reproducibility by the Source Direct Multi-Pixel Type)

Figure 1:
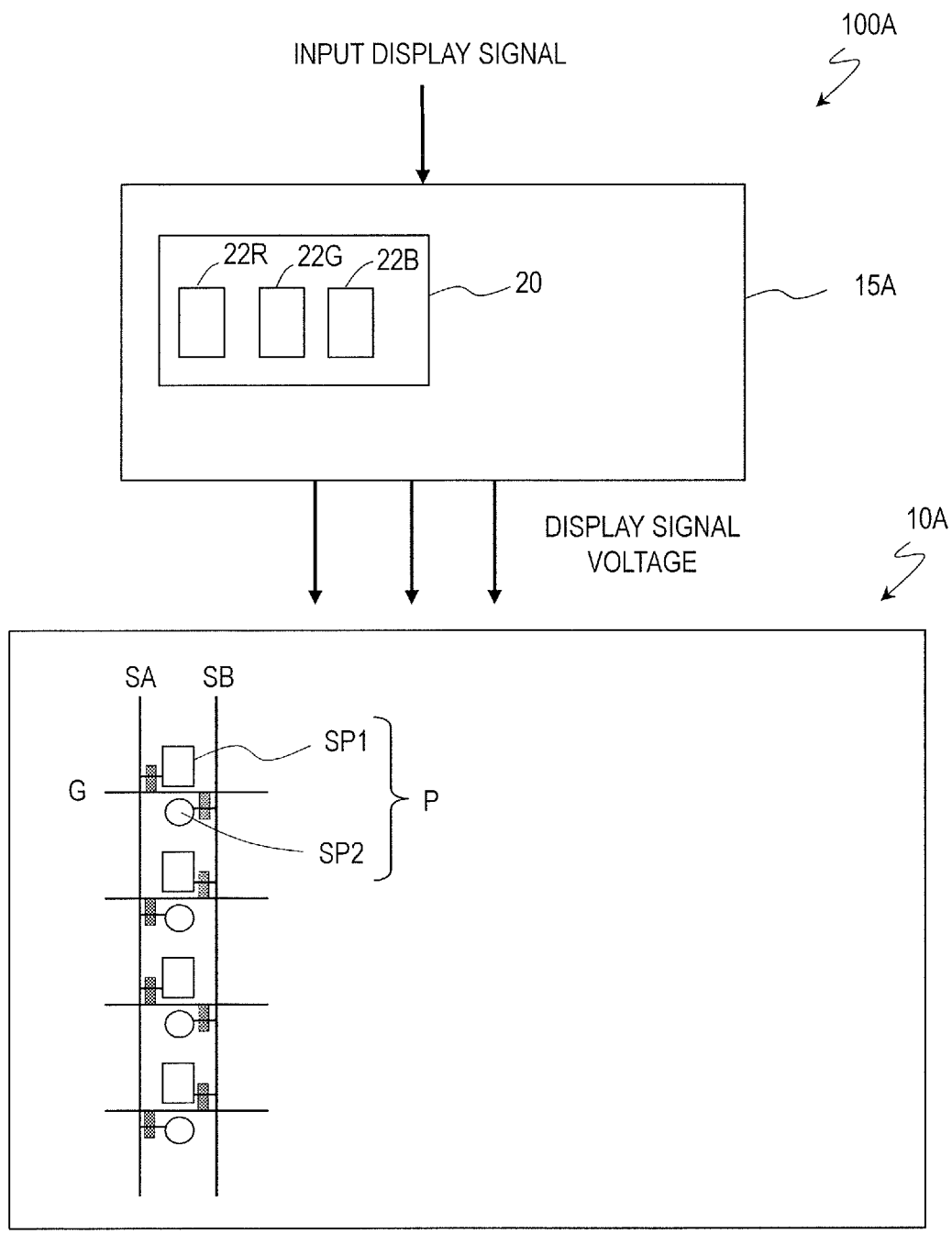
FIG. 1 A schematic diagram of a liquid crystal display device 100A according to an embodiment of the present invention.

As shown in FIG. 1, a liquid crystal display device 100A according to an embodiment of the present invention includes a liquid crystal display panel 10A which has a plurality of pixels P arranged in a matrix of rows and columns and a control circuit 15A configured to receive input display signals that are indicative of grayscale levels which are to be exhibited by the plurality of pixels P and supply display signal voltages to respective ones of the plurality of pixels P. A part or the entirety of the control circuit 15A may be formed integrally with the liquid crystal display panel 10A.

Each of the pixels P includes a first sub-pixel SP1 and a second sub-pixel SP2. The first sub-pixel SP1 is supplied with a first display signal voltage from the first source bus line SA. The second sub-pixel SP2 is supplied with a second display signal voltage from the second source bus line SB. The first display signal voltage and the second display signal voltage can be arbitrary voltages because they are supplied from two source bus lines SA and SB which are electrically independent of each other.

The liquid crystal display device 100A is a VA mode liquid crystal display device which operates in the normally-black mode. When the liquid crystal display device 100A displays at least an intermediate grayscale level, the first display signal voltage and the second display signal voltage are made different from each other, whereby the grayscale levels exhibited by the first sub-pixel SP1 and the second sub-pixel SP2 are also made different from each other. Multi-pixel driving may be performed only when the intermediate grayscale level is lower than the grayscale level of 96/255 of the grayscale (the $96^{th}$ grayscale level in the 256-level representation (from 0 to 255)).

Note that, herein, the "intermediate grayscale level" does not include any of the highest grayscale level (white) and the lowest grayscale level (black). When a pixel consists of only two sub-pixels, a grayscale level which is to be exhibited by the pixel is exhibited by the two sub-pixels. Therefore, the grayscale level exhibited by one of the sub-pixels is higher than a grayscale level to be exhibited by a pixel which is indicated by the input display signal (bright sub-pixel) and the grayscale level exhibited by the other sub-pixel is lower than the grayscale level to be exhibited by the pixel (dark sub-pixel). In this case, there are a plurality of combinations of the grayscale levels exhibited by the two sub-pixels. As the difference between the grayscale levels exhibited by the two sub-pixels (hereinafter, sometimes simply referred to as "grayscale level difference between sub-pixels") increases, the effect of improving the γ characteristic also increases. When the multi-pixel driving is not performed, the grayscale levels exhibited by the two sub-pixels are equal to the grayscale level exhibited by the pixel.

Next, the configuration of the liquid crystal display panel 10A is described with reference to FIG. 2.

The plurality of pixels P of the liquid crystal display panel 10A form a plurality of color display pixels CP. Each of the plurality of color display pixels CP includes three or more pixels P which exhibit different colors. In the example described in this section, each of the color display pixels CP consists of a red pixel (R pixel), a green pixel (G pixel) and a blue pixel (B pixel). Also, another example is described in which the pixels P of respective colors are in a stripe arrangement.

The pixels P in a matrix arrangement are identified by the row number and the column number. For example, a pixel P in the $m^{th}$ row and the $n^{th}$ column is expressed as P(m, n). For example, a pixel column Pn which is the $n^{th}$ column is red (R), a pixel column Pn+1 which is the $n+1^{th}$ column is green (G), and a pixel column Pn+2 which is the $n+2^{th}$ column is blue (B). Three consecutive pixels P arranged one after another in the row direction, for example, P(m, n), P(m, n+1) and P(m, n+2) in a pixel row Pm that is the $m^{th}$ row, constitute one color display pixel CP.

Each of the plurality of pixels P includes a first sub-pixel SP1 which is electrically connected to the first source bus line SA via the first TFT T1 and a second sub-pixel SP2 which is electrically connected to the second source bus line SB via the second TFT T2. The first TFT T1 and the second TFT T2 are, for example, configured so as to be connected to a common gate bus line G and supplied with a common scan signal as described in this section, although the present invention is not limited to this example. Scan signals may be supplied from different gate bus lines G. During a period in which the first TFT T1 and the second TFT T2 are kept ON by the scan signals, the first and second display signal voltages are supplied to the first and second sub-pixels SP1 and SP2 from the first and second source bus lines SA and SB, respectively. From the viewpoint of thus supplying display signal voltages from the two source bus lines SA and SB to one pixel P, high TFT driving performance is preferred. The first TFT T1 and the second TFT T2 are realized by, for example, TFTs which include a semiconductor oxide layer as the active layer.

The semiconductor oxide layer includes, for example, IGZO. Here, IGZO is an oxide of In (indium), Ga (gallium) and Zn (zinc) and include a wide variety of In—Ga—Zn—O oxides. IGZO may be amorphous or may be crystalline. A preferred crystalline IGZO layer is a crystalline IGZO layer whose c-axis is oriented generally perpendicular to the layer surface. The crystalline structure of such an IGZO layer is disclosed in, for example, Japanese Laid-Open Patent Publication No. 2012-134475. The entire disclosures of Japanese Laid-Open Patent Publication No. 2012-134475 are herein incorporated by reference.

The control circuit 15A of the liquid crystal display device 100A includes a bright/dark division control circuit 20 as shown in FIG. 1. The bright/dark division control circuit 20 includes, for example, primary color bright/dark division control circuits 22R, 22G and 22B for respective ones of the primary colors (here, respective ones of R, G and B). The control circuit 15A that includes the bright/dark division control circuit 20 is configured to generate a first display signal voltage and a second display signal voltage which are to be supplied to the first sub-pixel SP1 and the second sub-pixel SP2 of an arbitrary one of the pixels P based on a grayscale level to be exhibited by the arbitrary pixel P and grayscale levels to be exhibited by the two or more remaining pixels P included in a color display pixel CP to which the arbitrary pixel P belongs that are indicated by the input display signal, and output the generated first and second display signal voltages to the first source bus line SA and the second source bus line SB, respectively. That is, for one grayscale level which is to be exhibited by the arbitrary pixel P, the control circuit 15A is capable of generating the first display signal voltage and the second display signal voltage that have two or more different absolute values according to the grayscale levels to be exhibited by the two or more remaining pixels included in a color display pixel CP to which the arbitrary pixel P belongs. Therefore, for example, in the case where a color display pixel includes the first pixel (e.g., R pixel), the second pixel (e.g., G pixel) and the third pixel (e.g., B pixel) which exhibit different colors from one another, even when the grayscale level exhibited by the first pixel (R pixel) is the same, the first display signal voltage and the second display signal voltage that are supplied to the first sub-pixel and the second sub-pixel of the first pixel can be controlled to have different absolute values according to the grayscale levels exhibited by the second pixel and the third pixel. For example, as will be described later with a specific example, even when the grayscale level exhibited by the R pixel is the same, the grayscale level difference between sub-pixels of the R pixel can be varied between a case where the color exhibited by the color display pixel is a skin color and a case where the color exhibited by the color display pixel is an achromatic intermediate tone (gray).

Note that, in general, the control circuit 15A includes a timing control circuit, a gate bus line (scan line) driving circuit, a source bus line (signal line) driving circuit, etc., although these components are herein omitted for the sake of simplicity.

Figure 3:
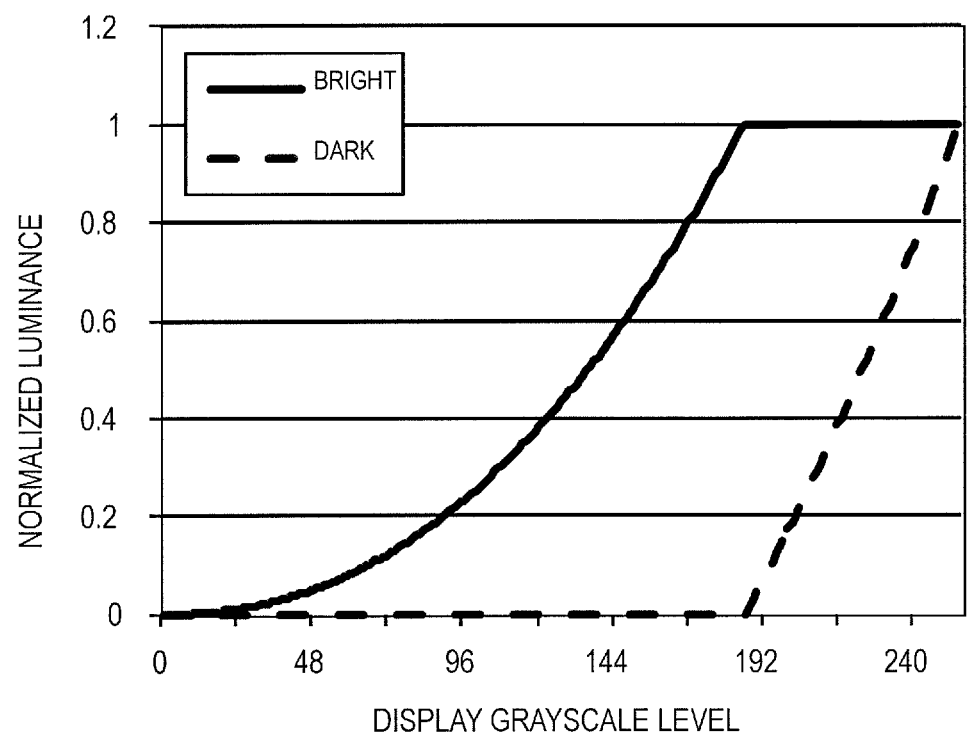
FIG. 3 A graph showing the relationship between the display grayscale level and the normalized luminance of the bright sub-pixel and the dark sub-pixel when multi-pixel driving is performed.

FIG. 3 is a graph showing the relationship between the display grayscale levels of the bright sub-pixel and the dark sub-pixel and the normalized luminance when the multi-pixel driving is performed. FIG. 3 is exemplary. In FIG. 3, the horizontal axis represents the display grayscale level which is to be displayed by a pixel (from 0 to 255), and the vertical axis represents the luminances exhibited by the two sub-pixels which are normalized on the assumption that the maximum value is 1. Note that in the example described herein, the area ratio of the bright sub-pixel and the dark sub-pixel is 1:1.

As the difference in normalized luminance between the bright sub-pixel and the dark sub-pixel (the difference in grayscale level converted from the luminance is the grayscale level difference between sub-pixels) increases, the effect of reducing the viewing angle dependence of the γ characteristic improves. Therefore, as illustrated in FIG. 3, it is preferred that the normalized luminance of the dark sub-pixel is 0.00 (the display grayscale level is 0) so long as it is possible. If a desired display grayscale level of a pixel is not achieved in the case where the normalized luminance of the bright sub-pixel is the maximum (i.e., 1.00 (the display grayscale level is 255)) and the normalized luminance of the dark sub-pixel is 0.00 (the display grayscale level is 0), the first and second display signal voltages are preferably generated such that the normalized luminance of the dark sub-pixel exceeds 0.00. Now, consider a case where the area ratio of the bright sub-pixel and the dark sub-pixel is 1:1 as shown in FIG. 3. When the display grayscale level of the pixel is in the range from the lowest grayscale level (0/255=black) to 186/255, only the display grayscale level of the bright sub-pixel increases while the display grayscale level of the dark sub-pixel is 0. When the display grayscale level of the pixel is in the range from 187/255 to the highest grayscale level (255/255=white), only the display grayscale level of the dark sub-pixel increases while the display grayscale level of the bright sub-pixel is constant (saturated) at 255/255.

Figure 4:
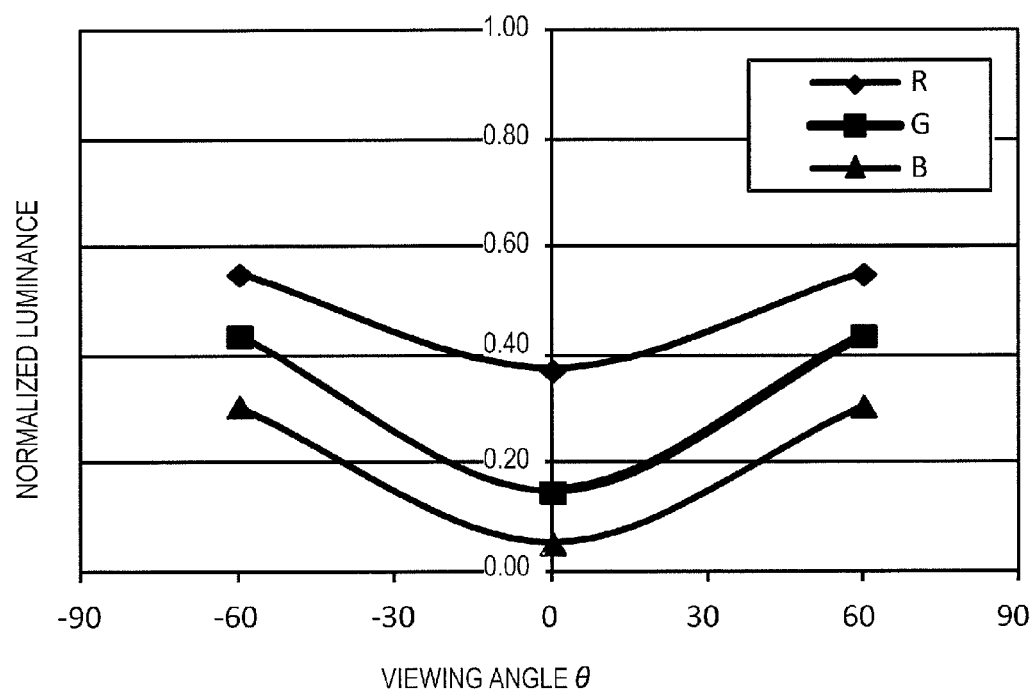
FIG. 4 (a) to (c) are charts for illustrating the display characteristics achieved when multi-pixel driving is not performed.
Figure 5:
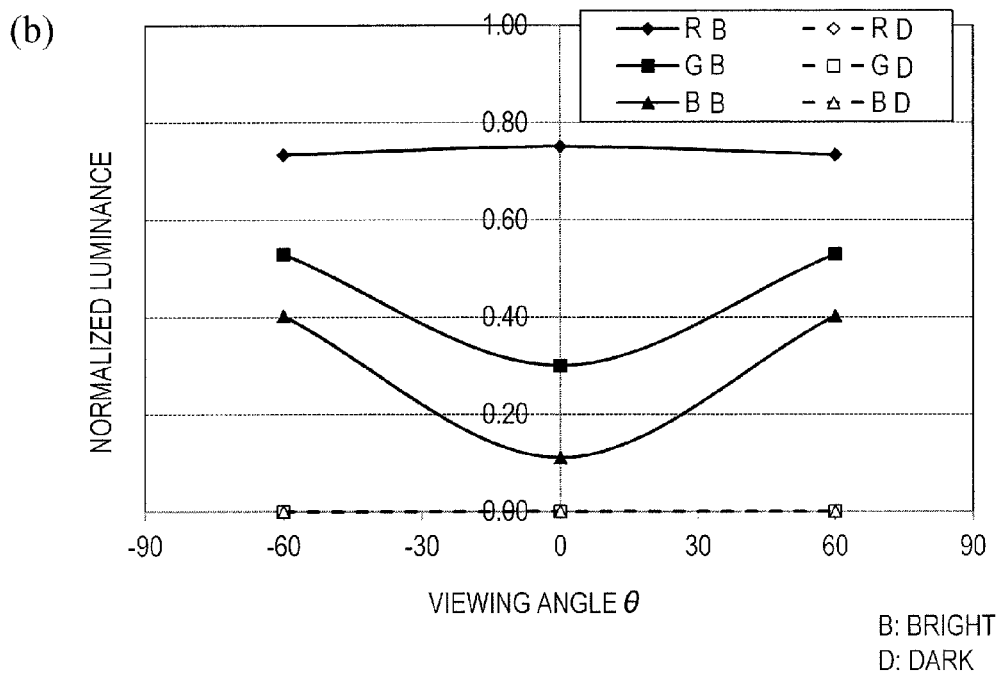
FIG. 5 (a) to (c) are charts for illustrating the display characteristics achieved when conventional multi-pixel driving is performed.
Figure 6:
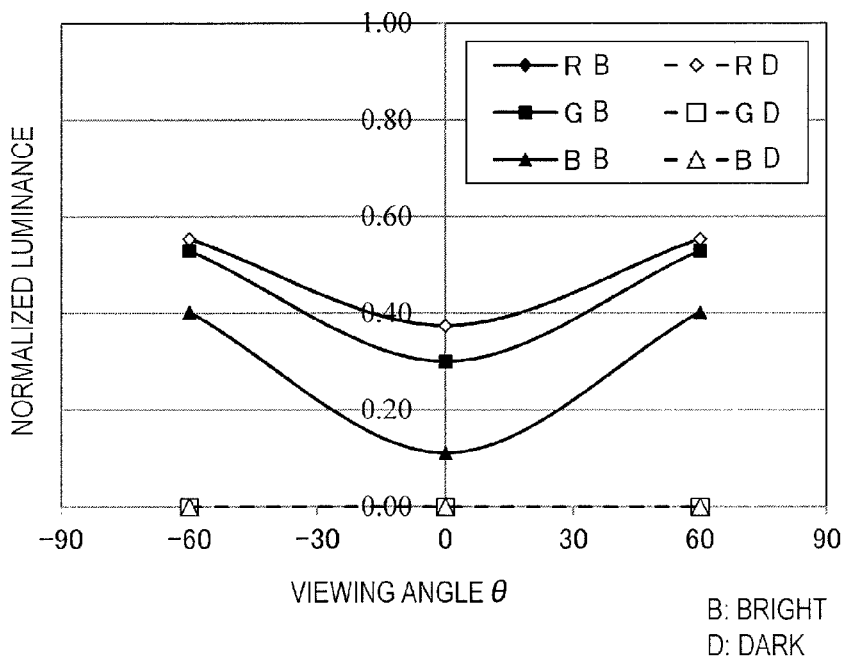
FIG. 6 (a) to (c) are charts for illustrating the display characteristics achieved when multi-pixel driving of an embodiment of the present invention is performed.

Next, the viewing angle dependence of the γ characteristic and the viewing angle dependence of the color reproducibility which are attributed to the multi-pixel driving are described with reference to FIG. 4 to FIG. 6.

FIGS. 4(a) to 4(c) are charts for illustrating the display characteristics achieved when the multi-pixel driving is not performed. FIGS. 5(a) to 5(c) are charts for illustrating the display characteristics achieved when conventional multi-pixel driving is performed. FIGS. 6(a) to 6(c) are charts for illustrating the display characteristics achieved when the multi-pixel driving of an embodiment of the present invention is performed. In the example described herein, the grayscale levels which are to be displayed by the R pixel, the G pixel and the B pixel are 180/255, 120/255 and 80/255, respectively.

Firstly, when the multi-pixel driving is not performed, the grayscale levels which are to be exhibited by the bright sub-pixel and the dark sub-pixel of each of the R, G and B pixels are equal to the grayscale levels which are to be exhibited by respective ones of the R, G and B pixels as shown in FIG. 4(a). The viewing angle dependences of the normalized luminances of respective ones of the pixels which are achieved in this case are shown in FIG. 4(b). The viewing angle dependences shown in FIG. 4(b) represent the dependence on the polar angle θ (angle with the normal to the display surface) in the azimuthal angle 0° or 180° (horizontal direction of the display surface). Here, the polar angle θ is sometimes referred to as "viewing angle θ". The same applies to FIG. 5(b) and FIG. 6(b).

As seen from FIG. 4(b), as the viewing angle θ (absolute value) increases, the normalized luminances of all the R, G and B pixels increase. Such a phenomenon that the luminance increases as the viewing angle is slanted to an oblique direction is called "whitening". The displayed color appears whitish.

This phenomenon can be quantitatively evaluated by using, for example, the parameters shown in FIG. 4(c).

FIG. 4(c) shows, for each of the R, G and B pixels, the normalized luminance acquired when viewed from the front, the normalized luminance acquired when viewed at an oblique viewing angle of polar angle 60°, and the viewing angle luminance ratio (oblique/front) that is calculated by dividing the normalized luminance acquired when viewed at an oblique viewing angle of polar angle 60° by the normalized luminance acquired when viewed from the front. FIG. 4(c) further shows, for each of the R, G and B pixels, values of the normalized luminance acquired when viewed from the front and the normalized luminance acquired when viewed at an oblique viewing angle of polar angle 60° which are normalized on the assumption that the normalized luminance of the R pixel in which the grayscale level to be displayed is the highest among the R, G and B pixels is 1.00 (RGB luminance ratio (also referred to as "luminance ratio between pixels")), and the values calculated by subtracting the RGB luminance ratio obtained when viewed from the front from the RGB luminance ratio obtained when viewed at an oblique viewing angle of polar angle 60° (RGB luminance ratio variation (oblique-front)). The value of the RGB luminance ratio variation (oblique-front) is a parameter which represents the color shift at the oblique viewing angle.

The viewing angle luminance ratios (oblique/front) of the R, G and B pixels are 1.48, 2.94 and 5.65, respectively, as shown in FIG. 4(c). In each of these pixels, it is seen that, the normalized luminance at the oblique 60° viewing angle is greater than the normalized luminance at the front viewing angle so that the displayed color appears whitish. Note that the magnitude of the increase in luminance at the oblique viewing angle (viewing angle luminance variation) is greater in the G pixel that is to display the grayscale level of 120/255 (2.94) than in the R pixel that is to display the grayscale level of 180/255 (1.48), and is greater in the B pixel that is to display the grayscale level of 80/255 (5.65) than in the G pixel that is to display the grayscale level of 120/255. The RGB luminance ratio (luminance ratio between pixels) relative to the highest grayscale level color is R pixel:G pixel:B pixel=1.00:0.40:0.15 when viewed from the front (i.e., when the color which is to be displayed is displayed). On the other hand, when viewed obliquely at 60°, R pixel:G pixel:B pixel=1.00:0.79:0.56, and it is seen that the luminances of the G pixel and the B pixel are excessively large.

The difference in the viewing angle dependence of the color reproducibility can be quantitatively evaluated by the value of the RGB luminance ratio variation (oblique-front) relative to the highest grayscale level color of FIG. 4(c). As shown in FIG. 4(c), the values of the RGB luminance ratio variation (oblique-front) relative to the highest grayscale level color are 0.00 for the R pixel that is to exhibit the highest grayscale level color and 0.39 and 0.41 for the G pixel and the B pixel, respectively. That is, it is seen that, as compared with the increase of the luminance of the R pixel that is to display the highest grayscale level among the three pixels (here, 180/255), the magnitude of the increases in luminance of the G pixel and the B pixel that are to display lower grayscale levels are large, and the magnitude of the increase in luminance of the B pixel that is to display a lower grayscale level than the G pixel is the largest. Thus, it is seen that the magnitude of the increase in luminance of a pixel due to slanting of the viewing angle depends on the grayscale level to be displayed, and as a result, the color reproducibility depends on the viewing angle.

The difference between a color perceived when viewed at the front viewing angle and a color perceived when viewed at the 60° oblique viewing angle is herein expressed by the value of the distance (Δu'v') between the u'v' coordinates in the CIE1976 UCS chromaticity diagram (hereinafter, sometimes simply referred to as "color difference"). In the case where the color to be displayed by the color display pixel is R, G, B=180, 120, 80, Δu'v'=0.057 when the multi-pixel driving is not performed.

Next, as shown in FIG. 5(a), to reduce the viewing angle dependence of the γ characteristic, the grayscale levels which are to be exhibited by the bright sub-pixel and the dark sub-pixel are set, and the multi-pixel driving is performed. For the purpose of maximizing the effect of the multi-pixel driving, the grayscale level which is to be exhibited by each of the dark sub-pixels of the R, G and B pixels is set to 0 while the grayscale levels which are to be exhibited by the bright sub-pixels of the R, G and B pixels are 232, 157 and 104, respectively.

As shown in FIG. 5(b), the luminance of the dark sub-pixel of each pixel is 0.00, so that it does not depend on the viewing angle. On the other hand, it is seen that the viewing angle dependence of the luminance of the bright sub-pixel of each pixel is small as compared with FIG. 4(b). In this case, the viewing angle luminance ratios (oblique/front) of the R, G and B pixels are 0.98, 1.76 and 3.63, respectively, as shown in FIG. 5(c). It is seen that these values are smaller than 1.48, 2.94 and 5.65 shown in FIG. 4(c). Thus, a variation in luminance due to the viewing angle is suppressed by the multi-pixel driving.

However, the RGB luminance ratio relative to the highest grayscale level color which is achieved when viewed obliquely at 60° is R pixel:G pixel:B pixel=1.00:0.72:0.55 as shown in FIG. 5(c). That is, the improvement over the RGB luminance ratio which is achieved when the multi-pixel driving is not performed such as shown in FIG. 4(c), R pixel:G pixel:B pixel=1.00:0.79:0.56, is small. The values of the RGB luminance ratio variation (oblique-front) relative to the highest grayscale level color which are shown in FIG. 5(c) are 0.32 and 0.40 for the G pixel and the B pixel, respectively. Although these values are slightly smaller than the values of the RGB luminance ratio variation (oblique-front) shown in FIG. 4(c) (0.39 and 0.41), the increase in luminance of the G pixel and the B pixel which are to exhibit different colors from the highest grayscale level color is large, and it cannot be said that the viewing angle dependence of the color reproducibility is suppressed. In this case, Δu'v'=0.056. The difference of this value from 0.057 that is achieved when the multi-pixel driving is not performed is small.

In the multi-pixel driving, the liquid crystal display device 100A according to an embodiment of the present invention is configured to set the grayscale level difference between two sub-pixels according to the grayscale levels to be exhibited by the remaining two or more pixels included in a color display pixel CP to which the pixel P belongs, rather than maximizing the difference between the grayscale levels which are to be exhibited by the two sub-pixels. Note that, in some cases, the grayscale level difference is set to 0 depending on the color exhibited by the color display pixel and the colors of the pixels.

In this example, as shown in FIG. 6(a), the multi-pixel driving is not performed for the R pixel which is to exhibit the highest grayscale level. That is, the grayscale level difference between sub-pixels is zero for the R pixel, while the grayscale level difference between sub-pixels for each of the G pixel and the B pixel is set to the maximum value similarly as in the example of FIG. 5(a).

Accordingly, as shown in FIG. 6(b), the viewing angle dependence of the R pixel is equal to the viewing angle dependence of the R pixel of FIG. 4(b), and the viewing angle dependences of the G pixel and the B pixel are equal to the viewing angle dependences of the G pixel and the B pixel of FIG. 5(b). Therefore, as shown in FIG. 6(c), the viewing angle luminance ratios (oblique/front) of the R, G and B pixels are 1.48, 1.76 and 3.63, respectively.

In that case, the RGB luminance ratio (the luminance ratio between pixels) relative to the highest grayscale level color which is achieved when viewed obliquely at 60° is R pixel:G pixel:B pixel=1.00:0.48:0.36 as shown in FIG. 6(c). It is seen that this value shows an improvement over R pixel:G pixel:B pixel=1.00:0.72:0.55 of FIG. 5(c). The values of the RGB luminance ratio variation (oblique-front) of the G pixel and the B pixel relative to the highest grayscale level color are 0.08 and 0.22, respectively, and as clearly seen from the comparison with the values of the RGB luminance ratio variation (oblique-front) shown in FIG. 5(c) (0.32 and 0.40), the viewing angle dependence of the color reproducibility is suppressed. In this case, Δu'v'=0.034, which is significantly smaller than 0.056 that is achieved when the conventional multi-pixel driving is performed. Thus, the liquid crystal display device 100A of the embodiment of the present invention is capable of reducing the viewing angle dependence of the color reproducibility.

Although in the example described herein the color display pixel consists of R, G and B pixels, the color display pixel may further include a yellow pixel (Ye pixel). Alternatively, the color display pixel may include a white pixel instead of the yellow pixel. Further, each of the plurality of color display pixels may include a red pixel, a green pixel, a blue pixel, a cyan pixel, a magenta pixel, and a yellow pixel.

According to an embodiment of the present invention, when the color display pixel consisting of the R, G and B pixels which has been described in the above example is used to display the grayscale level of 180/255 in the R pixel, 120/255 in the G pixel and 80/255 in the B pixel, the maximum value of the RGB luminance ratio variation (oblique-front) relative to the highest grayscale level color is 0.22. This value is considerably smaller than the maximum value of the RGB luminance ratio variation (oblique-front) relative to the highest grayscale level color in the conventional multi-pixel driving, 0.40. Although, as a matter of course, it is more preferred that the maximum value of the RGB luminance ratio variation (oblique-front) relative to the highest grayscale level color has a smaller value, the effect of reducing the viewing angle dependence of the color reproducibility is achieved so long as it is smaller than the maximum value of the RGB luminance ratio variation (oblique-front) relative to the highest grayscale level color in the conventional multi-pixel driving. It is preferred that the maximum value of the RGB luminance ratio variation (oblique-front) relative to the highest grayscale level color is not more than 0.25.

Generalizing the above discussion into a case where the color display pixel includes m pixels, the following description is possible. Here, an arbitrary one of the color display pixels includes m pixels, from the $1^{st}$ pixel to the $m^{th}$ pixel, where m is an integer which is not less than 3. The grayscale levels which are to be exhibited by the $1^{st}$ pixel to the $m^{th}$ pixel are the $1^{st}$ grayscale level GL1 to the $m^{th}$ grayscale level GLm. The luminances at the front viewing angle of the $1^{st}$ pixel to the $m^{th}$ pixel achieved when the $1^{st}$ pixel to the $m^{th}$ pixel exhibit the $1^{st}$ grayscale level GL1 to the $m^{th}$ grayscale level GLm which are normalized on the assumption that the luminance at the front viewing angle achieved when the highest grayscale level is exhibited is 1 are the $1^{st}$ frontal normalized luminance NL1 to the $m^{th}$ frontal normalized luminance NLm, respectively. The luminances at the oblique 60° viewing angle of the $1^{st}$ pixel to the $m^{th}$ pixel which are normalized on the assumption that the luminance at the oblique 60° viewing angle achieved when the highest grayscale level is exhibited is 1 are the 1st oblique viewing angle normalized luminance IL1 to the $m^{th}$ oblique viewing angle normalized luminance ILm, respectively. In this case, according to an embodiment, the control circuit 15 is configured to generate the first display signal voltage and the second display signal voltage that are to be supplied to the first sub-pixel and the second sub-pixel of each of the $1^{st}$ pixel to the $m^{th}$ pixel such that the maximum value of the difference between the frontal luminance ratios between pixels which are obtained by normalizing the $1^{st}$ frontal normalized luminance NL1 to the $m^{th}$ frontal normalized luminance NLm with respect to the highest one of the $1^{st}$ frontal normalized luminance NL1 to the $m^{th}$ frontal normalized luminance NLm and the oblique 60° luminance ratios between pixels which are obtained by normalizing the $1^{st}$ oblique viewing angle normalized luminance IL1 to the $m^{th}$ oblique viewing angle normalized luminance ILm with respect to the highest one of the $1^{st}$ oblique viewing angle normalized luminance IL1 to the $m^{th}$ oblique viewing angle normalized luminance ILm is not more than 0.25.

Next, connections of the pixel P and sub-pixels SP1, SP2 with the first source bus line SA and the second source bus line SB in the liquid crystal display panel 10A and the waveforms of the first display signal voltage and the second display signal voltage that are supplied to the first source bus line SA and the second source bus line SB, respectively, are described with reference to FIG. 2 and FIG. 7.

Figure 2:
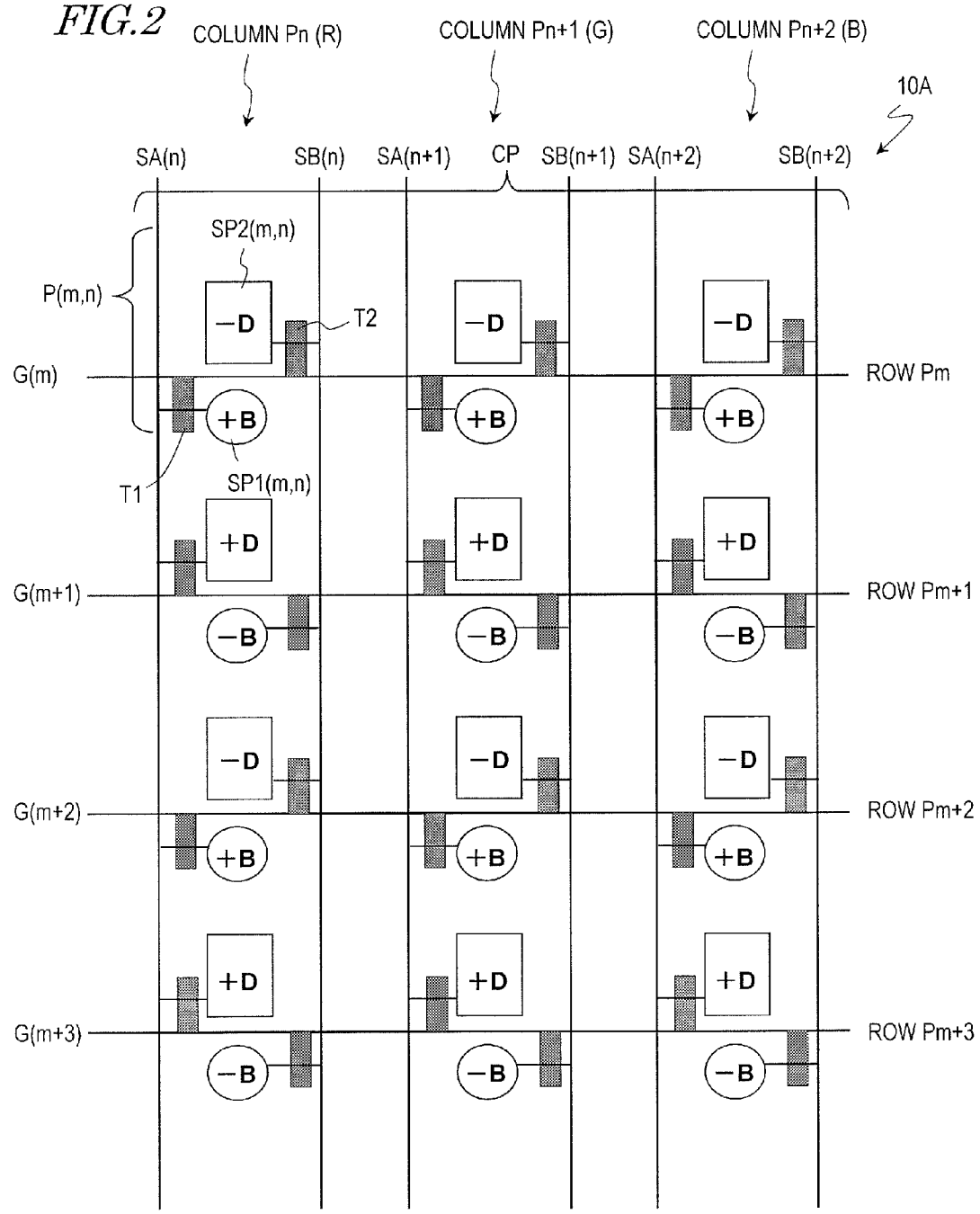
FIG. 2 A schematic diagram of a liquid crystal display panel 10A included in the liquid crystal display device 100A.

As shown in FIG. 2, the first source bus line SA and the second source bus line SB extend in the column direction. In each of the plurality of pixels P, the first sub-pixel SP1 and the second sub-pixel SP2 are arranged in the column direction. As described above, some of the pixels P arranged in the column direction are to exhibit the same color. Two sub-pixels which belong to two pixels P adjacent to each other in the column direction and which are electrically connected to the first source bus line SA are adjacent to each other in the column direction. For example, the sub-pixel SP1 of the pixel P(m, n) and the sub-pixel SP2 of the pixel P(m+1, n) are both electrically connected to the first source bus line SA via the first TFT T1 and are adjacent to each other.

Figure 7:
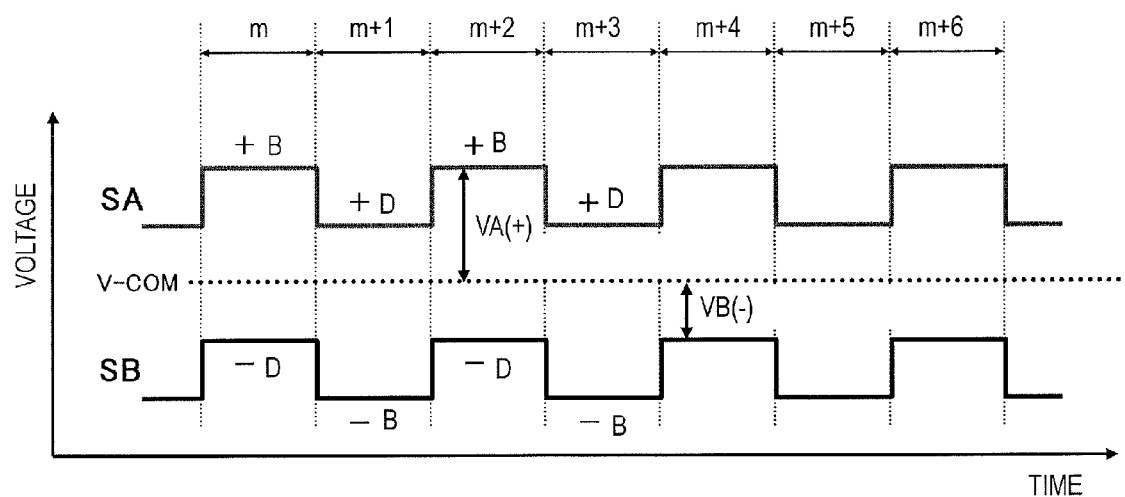
FIG. 7 A graph showing the waveforms of display signal voltages supplied to two sub-pixels.

FIG. 7 shows an example of the waveforms of the first display signal voltage supplied from the first source bus line SA and the second display signal voltage supplied from the second source bus line SB.

As shown in FIG. 7, the polarity of the first display signal voltage supplied from the first source bus line SA and the polarity of the second display signal voltage supplied from the second source bus line SB are each constant within a frame. The polarity of the first display signal voltage supplied from the first source bus line SA and the polarity of the second display signal voltage supplied from the second source bus line SB are opposite to each other in a frame. Here, the "frame" means a period between selection of a gate bus line (scan line) and the next selection of the same gate bus line, and is also sometimes referred to as "one vertical scan period". The polarity of the first display signal voltage and the polarity of the second display signal voltage are inverted every frame or every two or more frames. Inversion of the polarity with intervals which are equal to or longer than the frame period can be appropriately set such that a DC voltage is not applied across the liquid crystal layer in a long drive operation.

When the first and second display signal voltages shown in FIG. 7 are supplied to the liquid crystal display panel 10A that has the configuration shown in FIG. 2, the interval of polarity inversion of the display signal voltages is one frame, and dot inversion is realized in every frame. Therefore, the display quality can be improved while the power consumption is suppressed. In this case, for example, when pixels of one pixel column exhibit an intermediate grayscale level and a grayscale level difference between sub-pixels is given to form bright sub-pixels and dark sub-pixels, bright sub-pixels which are electrically connected to the first source bus line SA and bright sub-pixels which are electrically connected to the second source bus line SB alternately occur in the pixel column.

In this case, the first display signal voltage and the second display signal voltage are oscillating voltages whose amplitudes vary every horizontal scan period (sometimes referred to as "1H"). The period of the oscillation is 2H. That is, in each of the first display signal voltage and the second display signal voltage, the amplitude for the bright sub-pixel and the amplitude for the dark sub-pixel occur alternately every horizontal scan period. Note that the largeness (amplitude) of a display signal voltage refers to a largeness (amplitude) of the display signal voltage measured relative to the counter voltage (also referred to as "common voltage"). Note that one horizontal scan period refers to the difference (period) between a time of selection of one gate bus line (e.g., $m^{th}$ gate bus line) and a time of selection of the next gate bus line (e.g., m+$1^{th}$ gate bus line).

Figure 8:
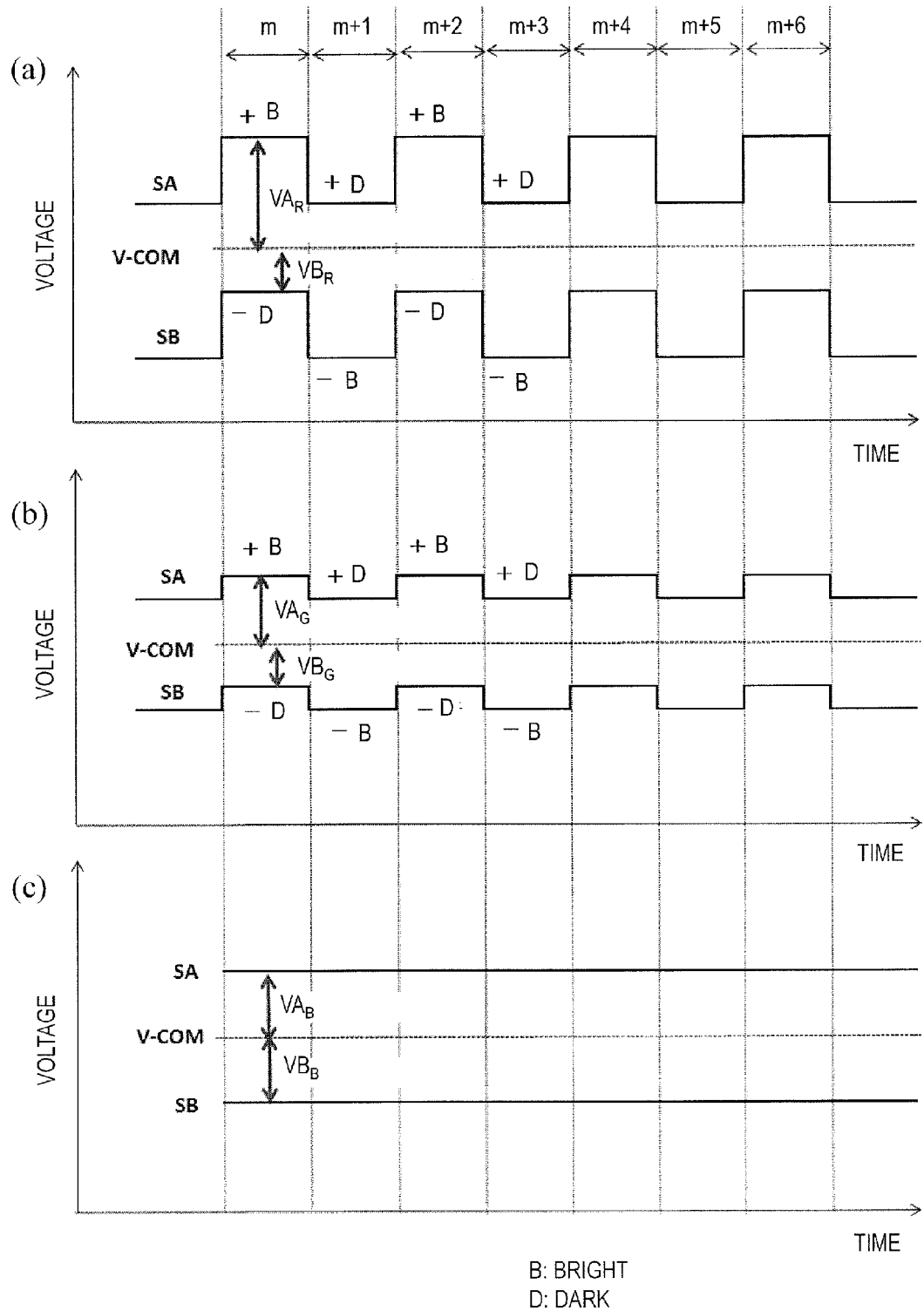
FIG. 8 (a) to (c) are charts showing examples of the waveforms of the first and second display signal voltages supplied to two sub-pixels included in R, G and B pixels, respectively.

FIGS. 8(a) to 8(c) show examples of the waveforms of the first and second display signal voltages supplied to two sub-pixels included in the R, G and B pixels.

In the liquid crystal display device 100A of the embodiment of the present invention, as described above, the first sub-pixel SP1 of each pixel P is supplied with the first display signal voltage from the first source bus line SA, and the second sub-pixel SP2 is supplied with the second display signal voltage from the second source bus line SB. The first display signal voltage and the second display signal voltage are supplied from the two source bus lines SA and SB that are electrically independent of each other and are therefore arbitrary voltages. Thus, the first display signal voltage and the second display signal voltage supplied to the first sub-pixel SP1 and the second sub-pixel SP2 of the R, G and B pixels which constitute one color display pixel can be freely set as shown in FIGS. 8(a) to 8(c).

Next, whether or not the viewing angle dependence of the color reproducibility can be reduced by determining the first and second display signal voltages for each of the pixels (e.g., the R, G and B pixels) is described with reference to FIG. 9 and FIG. 10.

Figure 9:
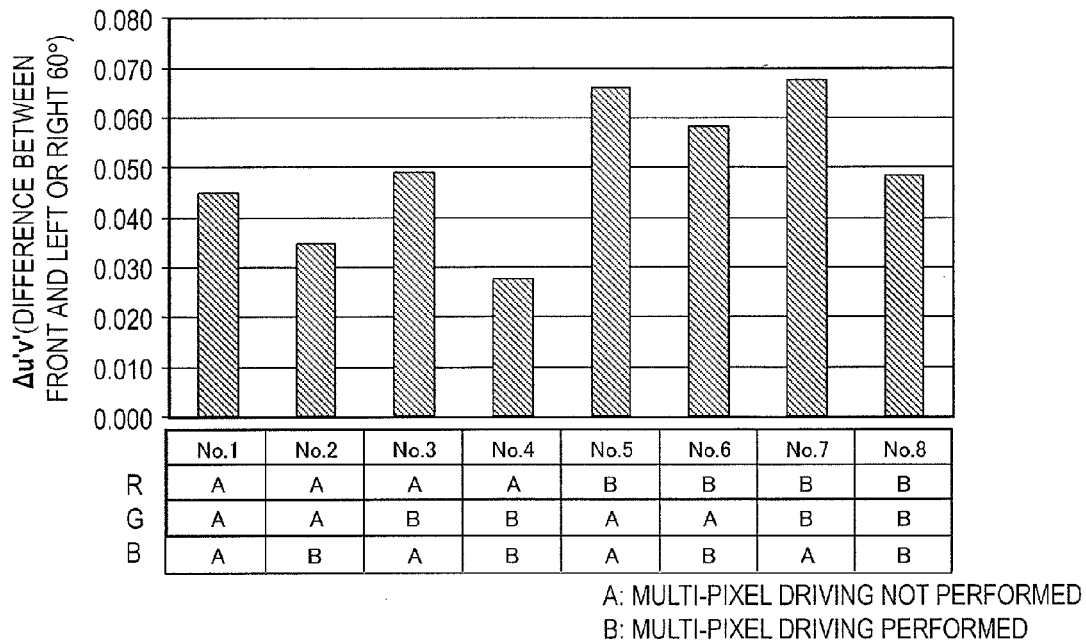
FIG. 9 A graph showing the relationship between the combinations of whether or not the multi-pixel driving is performed on R, G and B pixels and the viewing angle dependence of the color reproducibility in the case where the R, G and B pixels are used to exhibit a skin color.

FIG. 9 is a graph showing the relationship between the combinations of whether or not the multi-pixel driving is performed on R, G and B pixels and the viewing angle dependence of the color reproducibility in the case where a skin color is displayed using the R, G and B pixels.

Here, the skin color refers to such a color that, as described in Patent Document 2, the ranges of the grayscale level of the R, G and B pixels (from minimum to maximum) are from 105 to 255 for the R pixel, from 52 to 223 for the G pixel, and from 44 to 217 for the B pixel, and meanwhile, the grayscale levels of the three primary colors satisfy the relationship of R pixel>G pixel>B pixel. As for the color reproducibility of the display device, the memory colors are regarded as important. Since an image displayed on the display device cannot be directly compared with an actual object in almost all the cases, the relationship between the displayed image and an image in viewer's memory is important. For the display devices for television applications, the skin color is regarded as particularly important among the memory colors.

In the example shown in FIG. 9, a skin color is displayed of which the grayscale levels to be displayed by the R, G and B pixels are 88/255, 61/255 and 39/255. In FIG. 9, "A" shown under the horizontal axis means that "the multi-pixel driving is not performed". In this case, two sub-pixels exhibit the same grayscale level. "B" means that "the multi-pixel driving is performed". In this case, the grayscale level difference between the first sub-pixel and the second sub-pixel is set to the maximum. In FIG. 9, the vertical axis represents the value of the difference between a color perceived when viewed at the front viewing angle and a color perceived when viewed at the 60° oblique viewing angle (color difference), which is expressed by the distance (Δu'v') between the u'v' coordinates in the CIE1976 UCS chromaticity diagram.

As seen from FIG. 9, among the combinations of No. 1 to No. 8, the color difference of No. 4 where "the multi-pixel driving is not performed" on the R pixel while "the multi-pixel driving is performed" on the G pixel and the B pixel (which is the same as the example of FIG. 6) is less than 0.03, i.e., smaller than those of the other combinations.

In the case where the color display pixel includes m pixels, from the $1^{st}$ pixel to the $m^{th}$ pixel (m is an integer which is not less than 3), the grayscale levels which are to be exhibited by the $1^{st}$ pixel to the $m^{th}$ pixel are the 1st grayscale level GL1 to the $m^{th}$ grayscale level GLm, respectively, and the $1^{st}$ grayscale level GL1 to the $m^{th}$ grayscale level GLm include at least two different grayscale levels, the control circuit 15A of an embodiment is configured to generate voltages which have equal absolute values as the first display signal voltage and the second display signal voltage respectively supplied to the first sub-pixel and the second sub-pixel of a pixel which is to exhibit a grayscale level of the largest value among the 1st grayscale level GL1 to the $m^{th}$ grayscale level GLm. The thus-configured control circuit 15A can improve the viewing angle dependence of the color reproducibility of intermediate tones including the above-described skin color (exclusive of achromatic colors).

Figure 10:
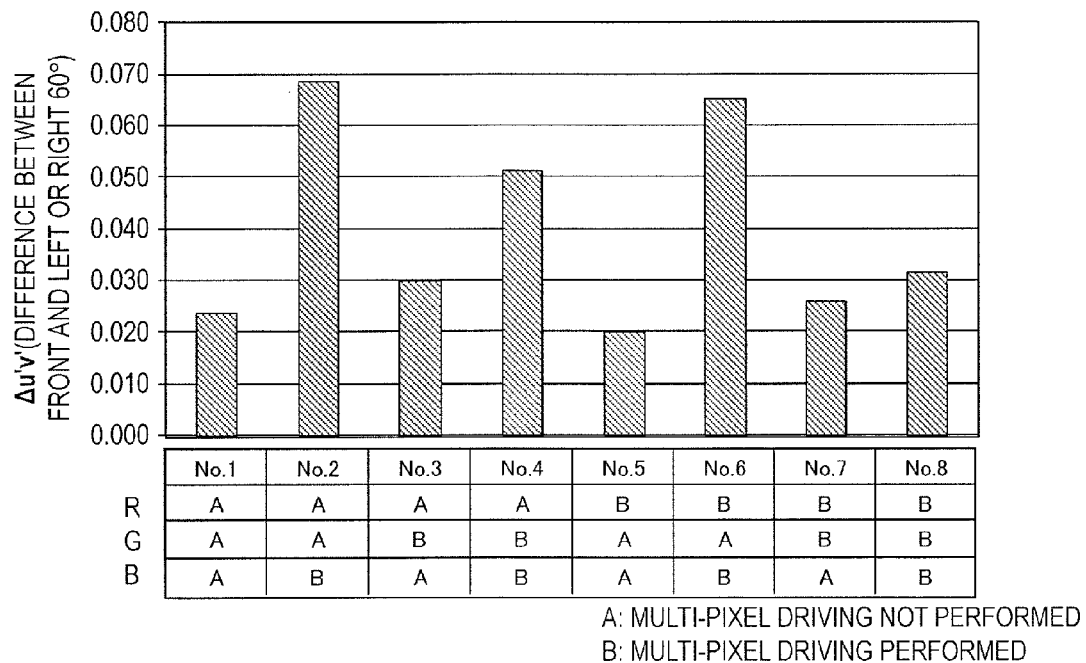
FIG. 10 A graph showing the relationship between the combinations of whether or not the multi-pixel driving is performed on R, G and B pixels and the viewing angle dependence of the color reproducibility in the case where the R, G and B pixels are used to exhibit an achromatic intermediate tone (gray).

FIG. 10 is a graph showing the relationship between the combinations of whether or not the multi-pixel driving is performed on R, G and B pixels and the viewing angle dependence of the color reproducibility in the case where the R, G and B pixels are used to exhibit an achromatic intermediate tone (gray). When the achromatic intermediate tone is colored, it gives a viewer a sense of incongruity, and therefore, suppressing coloring of the achromatic intermediate tone is important in terms of the color reproducibility.

In the example shown in FIG. 10, an achromatic intermediate tone is displayed of which the grayscale levels to be exhibited by the R, G and B pixels are 135/255, 135/255, and 135/255.

As seen from FIG. 10, among the combinations of No. 1 to No. 8, the color difference of No. 5 where "the multi-pixel driving is performed" on the R pixel while "the multi-pixel driving is not performed" on the G pixel and the B pixel is less than 0.02, i.e., smaller than those of the other combinations.

In the case where the color display pixel includes m pixels, from the $1^{st}$ pixel to the $m^{th}$ pixel (m is an integer which is not less than 3), including a blue pixel and a green pixel, the highest and lowest grayscale levels among the grayscale levels which are to be exhibited by the $1^{st}$ pixel to the $m^{th}$ pixel are GLmax and GLmin, respectively, and the value of GLmax/GLmin is in the range of not less than 0.95 and not more than 1.05, the control circuit 15A of an embodiment is configured to generate voltages which have equal absolute values as the first display signal voltage and the second display signal voltage supplied to the first sub-pixel and the second sub-pixel of the blue pixel and the green pixel. For example, when the value of GLmax/GLmin is in the range of not less than 0.95 and not more than 1.05, the color exhibited by the color display pixel is close to the achromatic intermediate tone, and therefore, the viewing angle dependence of the color reproducibility can be reduced by the above-described control circuit.

As described in the above example, it is preferred that the difference between the absolute values of the first display signal voltage and the second display signal voltage respectively supplied to the first sub-pixel and the second sub-pixel of a pixel on which "the multi-pixel driving is performed" is the maximum, although the present invention is not limited to this example. It may be appropriately changed according to the γ characteristic of the liquid crystal display panel.

Next, examples of the look-up table used for generation of display signal voltages which are to be supplied to two sub-pixels in the control circuit 15A are described with reference to FIG. 11 to FIG. 13.

FIG. 11 shows a look-up table used for, for example, the case previously described with reference to FIG. 9 where "the multi-pixel driving is not performed" on the R pixel which is to exhibit the highest grayscale level while "the multi-pixel driving is performed" on the G pixel and the B pixel.

For example, as shown in FIG. 11(a), when the R pixel is at the grayscale level of 0, the R pixel cannot be at the highest grayscale level. Therefore, a look-up table which is the same as a conventional one may be used. Note that numerical values are omitted from the drawing.

As shown in FIG. 11(b), for example, when the R pixel exhibits the grayscale level of 180/255, the G pixel exhibits the grayscale level of 120/255, and the B pixel exhibits the grayscale level of 80/255 (corresponding to a skin color), "the multi-pixel driving is not performed" on the R pixel and the R pixel exhibits the grayscale level of 180/255, while the grayscale level difference is given such that the maximum grayscale level difference is achieved in each of the G pixel and the B pixel.

When the R pixel exhibits the grayscale level of 255/255, numerical values are given to the look-up table shown in FIG. 11(c) such that the maximum grayscale level difference between sub-pixels is achieved in each of the G pixel and the B pixel at all the grayscale levels except for 0 and 255. Note that numerical values are omitted from the drawing.

A look-up table for a case where the pixel which is to exhibit the highest grayscale level is the G pixel and a look-up table for a case where the pixel which is to exhibit the highest grayscale level is the B pixel are prepared likewise as in FIG. 11 and are stored in, for example, a memory included in the primary color bright/dark division control circuits 22R, 22G and 22B shown in FIG. 1.

FIG. 12 shows another example of the look-up table used for generation of display signal voltages supplied to two sub-pixels in a liquid crystal display device of an embodiment of the present invention.

A look-up table in which combinations of output grayscale levels for each of the color pixels correspond to input grayscale levels as shown in FIG. 12 may also be used.

For example, when all of the R, G and B pixels exhibit the grayscale level of 135/255 as shown in FIG. 10, "the multi-pixel driving is performed" only on the R pixel.

In the case where a skin color is displayed such that the R, G and B pixels are at the grayscale levels of 180/255, 120/255 and 80/255, respectively, "the multi-pixel driving is not performed" on the R pixel while "the multi-pixel driving is performed" on the G pixel and the B pixel.

Although in the above-described example a single color display pixel consists of R, G and B pixels, the color display pixel may further include a Ye pixel (yellow pixel) as shown in FIG. 13. As a matter of course, the color display pixel may include a white pixel instead of the yellow pixel. Further, the color display pixel may include a red pixel, a green pixel, a blue pixel, a cyan pixel, a magenta pixel, and a yellow pixel. Numerical values which are to be inserted in blank boxes of FIG. 13 are set so as to satisfy the above-described conditions.

(Repairing of Disconnection of Source Bus Line of Liquid Crystal Display Device of Source Direct Multi-Pixel Type)

As described in the above example, employing the source direct multi-pixel type enables reduction of the viewing angle dependence of the color reproducibility. However, when a display signal voltage supplied to a source bus line has an oscillatory waveform as in the liquid crystal display device of the above-described example, repairing with the use of a spare wire as will be described with reference to FIG. 14 leads to a dull oscillatory waveform of the display signal voltage, and as a result, desired display cannot be achieved in some cases. Here, the above-described liquid crystal display device which is capable of reducing the viewing angle dependence of the color reproducibility is considered as an example where the display signal voltage has an oscillatory waveform, although a liquid crystal display device of the source direct multi-pixel type which is capable of repairing disconnection of the source bus line, which will be described below, is not limited to this example.

In a liquid crystal display device 200 of the conventional source direct multi-pixel type, if a display signal voltage supplied to a source bus line has an oscillatory waveform (an oscillatory waveform which has a particularly short oscillation period, for example, an oscillatory waveform whose oscillation period is not more than two horizontal scan periods (2H)), repairing with the use of a spare wire is difficult. The reasons for the difficulty are first described with reference to FIG. 14.

Figure 14:
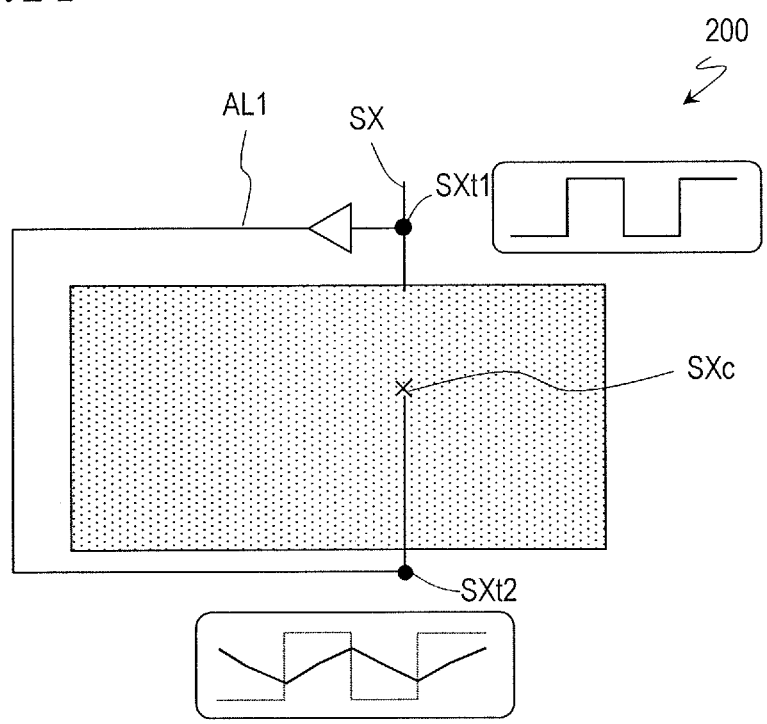
FIG. 14 A diagram for illustrating a problem in repairing disconnection of a source bus line with the use of a spare wire in a liquid crystal display device of the source direct multi-pixel type.

For example, as described in Patent Document 3 identified above, a method of repairing disconnection of the source bus line with the use of a spare wire provided around a display region (a region in which a plurality of pixels are arranged) has been known. Specifically, as shown in FIG. 14, a disconnected source bus line SX is connected to a spare wire AL1 at two positions SXt1 and SXt2, whereby supply of a display signal voltage to the disconnected position SXc of the source bus line SX is enabled. For example, the spare wire AL1 intersects with the source bus line SX via an insulating layer interposed therebetween. By breaking this insulating layer at the two positions SXt1 and SXt2, the spare wire AL1 and the source bus line SX are electrically connected to each other. There are various other examples of the disconnection repairing method with the use of a spare wire which have already been developed (see, for example, Japanese Laid-Open Patent Publications Nos. 5-5896 and 2010-271413).

In a liquid crystal display device of the source direct multi-pixel type, the display signal voltage has an oscillatory waveform and its period is, for example, two horizontal scan periods (2H) as in the above-described example. That is, the amplitude varies every horizontal scan period. Accordingly, a display signal voltage which has a predetermined oscillatory waveform is supplied because the connecting position SXt1 of the source bus line SX is near a source driver (not shown) as shown in FIG. 14. On the other hand, at the connecting position SXt2, the display signal voltage is supplied via the spare wire AL1 that is arranged so as to detour around outside the display region, so that the oscillatory waveform of the display signal voltage is dull as shown in FIG. 14. That is, since the spare wire AL1 is long, CR (capacitance×resistance) of the spare wire AL1 is large, and as a result, the oscillatory waveform of the display signal voltage at the connecting position SXt2 is dull. Due to the dull oscillatory waveform, the effective voltage value of the display signal voltage decreases or increases so that desired display cannot be achieved.

Figure 15:
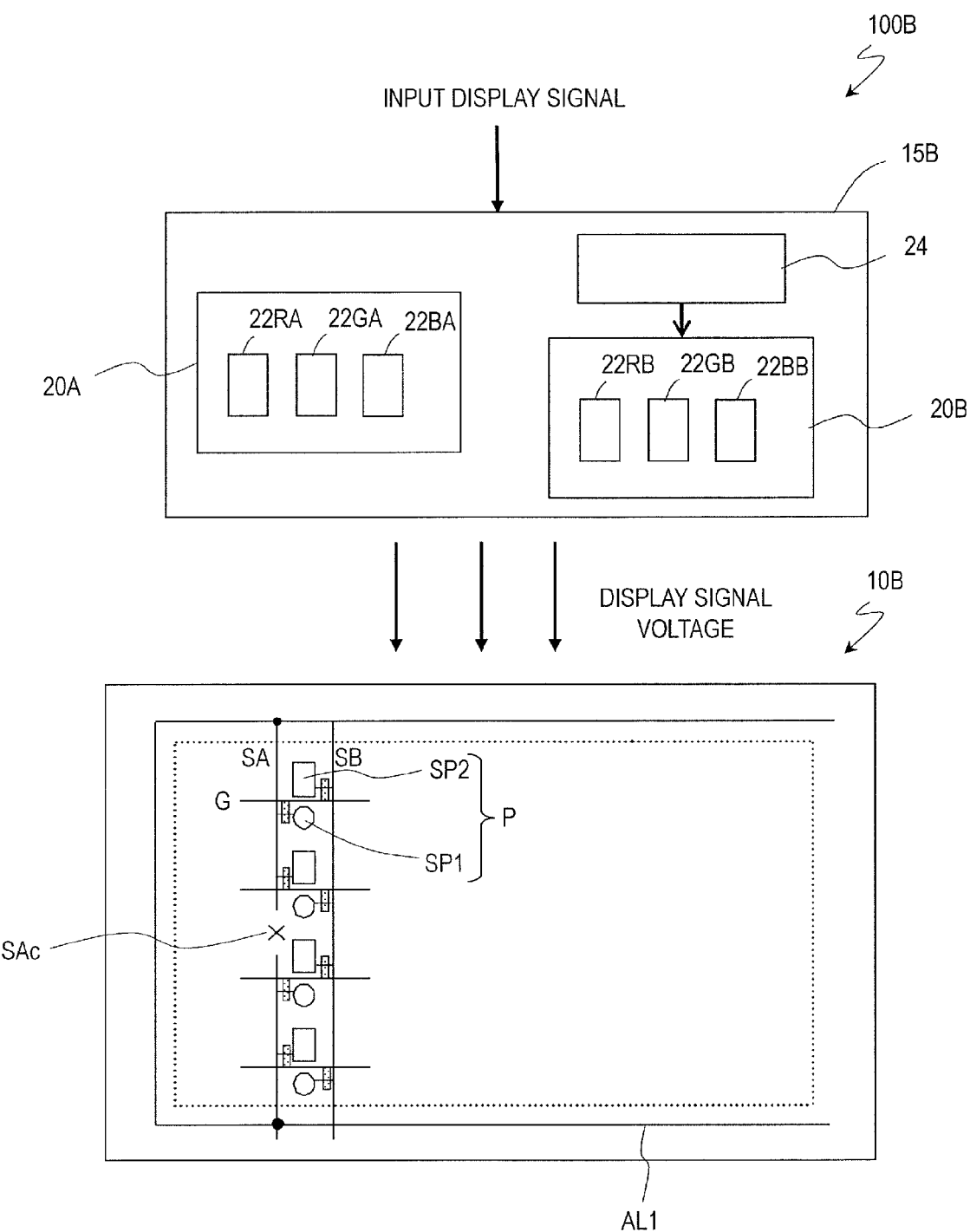
FIG. 15 A schematic diagram of a liquid crystal display device 100B according to another embodiment of the present invention.

FIG. 15 shows a liquid crystal display device 100B of the present embodiment. The liquid crystal display device 100B has the function of repairing disconnection of a source bus line in addition to the previously-described liquid crystal display device 100A.

The liquid crystal display device 100B includes a liquid crystal display panel 10B which has a plurality of pixels P arranged in a matrix of rows and columns and a control circuit 15B configured to receive input display signals that are indicative of grayscale levels which are to be exhibited by the plurality of pixels P and supply display signal voltages to respective ones of the plurality of pixels P. A part or the entirety of the control circuit 15B may be formed integrally with the liquid crystal display panel 10B.

The liquid crystal display panel 10B is configured in the same way as the liquid crystal display panel 10A as follows. Each of the pixels P includes a first sub-pixel SP1 and a second sub-pixel SP2. The first sub-pixel SP1 is supplied with a first display signal voltage from the first source bus line SA. The second sub-pixel SP2 is supplied with a second display signal voltage from the second source bus line SB. The first display signal voltage and the second display signal voltage can be arbitrary voltages because they are supplied from two source bus lines SA and SB which are electrically independent of each other.

The liquid crystal display panel 10B further includes a spare wire AL1 which is arranged so as to detour around outside the display region. The spare wire AL1 is configured so as to be electrically connectable to an arbitrary source bus line. FIG. 15 shows an example where the spare wire AL1 is connected to a disconnected source bus line SA. In the example shown in the drawing, a single spare wire AL1 is provided, although in general a plurality of spare wires are provided. Since the plurality of spare wires need to be electrically independent of one another, the area (width) of a region outside the display region that is enclosed by a dotted line in FIG. 15 (also referred to as "frame region") increases as the number of the spare wires increases. Therefore, to avoid an unnecessarily large frame region, the number of the spare wires is set in consideration of the number of source bus lines which need repairing (the rate of incidence of disconnection), or the like. For example, the number of the spare wires is from five to ten.

When the first source bus line SA or the second source bus line SB which is associated with pixels of one column is electrically connected with the spare wire AL1, the control circuit 15B of the liquid crystal display device 100B is capable of controlling the amplitude of the oscillation of the first display signal voltage and the second display signal voltage which are to be output to the first source bus line SA and the second source bus line SB associated with the pixels of the column (sometimes referred to as "source bus line pair") so as to be smaller than that achieved when the first source bus line SA or the second source bus line SB associated with the pixels is not electrically connected with the spare wire AL1. By decreasing the amplitude of the oscillation of the first display signal voltage and the second display signal voltage, the dullness of the oscillatory waveform due to the spare wire is reduced. In this case, the absolute values of the amplitudes of the oscillation of the first display signal voltage and the second display signal voltage are controlled to be equal to each other, for example. Typically, the amplitudes of the oscillation of the first display signal voltage and the second display signal voltage are zero. That is, the multi-pixel driving is not performed on a source bus line pair which includes a repaired source bus line.

For example, the control circuit 15B shown in FIG. 15 includes two bright/dark division control circuits 20A and 20B and a source bus line designation circuit 24. The bright/dark division control circuit 20A includes primary color bright/dark division control circuits 22RA, 22GA and 22BA for respective ones of the primary colors (here, for respective ones of R, G and B). The bright/dark division control circuit 20B also includes primary color bright/dark division control circuits 22RB, 22GB and 22BB for respective ones of the primary colors. The control circuit 15B also includes a timing control circuit, a gate bus line (scan line) driving circuit, a source bus line (signal line) driving circuit, etc., as does the control circuit 15A, although these components are herein omitted for the sake of simplicity.

The bright/dark division control circuit 20A has substantially the same configuration, and carries out substantially the same operation, as the bright/dark division control circuit 20 of the liquid crystal display device 100A. The bright/dark division control circuit 20B is configured to output the first display signal voltage and the second display signal voltage respectively to a first source bus line SA and a second source bus line SB designated by the source bus line designation circuit 24. The amplitudes of the oscillation of the first display signal voltage and the second display signal voltage generated by and output from the bright/dark division control circuit 20B are smaller than the amplitudes of the oscillation of the first display signal voltage and the second display signal voltage generated by and output from the bright/dark division control circuit 20A. This relationship preferably holds true at an arbitrary intermediate grayscale level (exclusive of the lowest grayscale level and the highest grayscale level) of an input display signal, although this is not necessarily indispensable.

Assume now that, for example, in the process of manufacturing the liquid crystal display panel 10B, disconnection occurs in a first source bus line SA or a second source bus line SB which is associated with pixels of a column, and the disconnection is repaired using the spare wire AL1. In this case, as a result of the repairing with the use of the spare wire AL1, information that specifies the first source bus line SA or the second source bus line SB which is electrically connected to the spare wire AL1 is written in the source bus line designation circuit 24. Information that specifies both the source bus line (SA or SB) electrically connected to the spare wire AL1 and a source bus line (SB or SA) which is associated with the same pixels (i.e., source bus line pair) may be written in the source bus line designation circuit 24. The source bus line designation circuit 24 designates, based on the written information, a source bus line pair to which the bright/dark division control circuit 20B is to output the first display signal voltage and the second display signal voltage. To the other source bus lines than the source bus line pair designated by the source bus line designation circuit 24, the first display signal voltage and the second display signal voltage are output from the bright/dark division control circuit 20A.

That is, the two bright/dark division control circuits 20A and 20B of the control circuit 15B are capable of generating the first display signal voltages and the second display signal voltages which have different amplitudes for the same input display signal. Typically, the amplitudes of the oscillation of the first display signal voltage and the second display signal voltage output to a source bus line pair including a repaired source bus line, which is designated by the source bus line designation circuit 24, are zero.

Note that as described above as to the liquid crystal display device 100A of the previous embodiment, for example, in the case where the color display pixel consisting of the R, G and B pixels exhibits a skin color, the multi-pixel driving is not performed on the R pixel. Therefore, even when disconnection occurs in at least one of a source bus line pair associated with the R pixel and the disconnection is repaired using the spare wire AL1, the first display signal voltage and the second display signal voltage output to the source bus line pair associated with the R pixel would not vary. That is, the first display signal voltage and the second display signal voltage output from the bright/dark division control circuit 20A and the first display signal voltage and the second display signal voltage output from the bright/dark division control circuit 20B may be equal in some cases.

Examples of the waveforms of the first display signal voltage output to the first source bus line SA and the second display signal voltage output to the second source bus line SB from the bright/dark division control circuit 20A and the bright/dark division control circuit 20B are described with reference to FIG. 16. FIG. 16(a) shows an example of the waveforms of the first display signal voltage SA1 output from a bright/dark division control circuit 20A to the first source bus line SA and the second display signal voltage SB1 output from the bright/dark division control circuit 20A to the second source bus line SB. FIG. 16(b) shows an example of the waveforms of the first display signal voltage SA2 output from a bright/dark division control circuit 20B to the first source bus line SA and the second display signal voltage SB2 output from the bright/dark division control circuit 20B to the second source bus line SB.

The waveforms of the first display signal voltage SA1 and the second display signal voltage SB1 shown in FIG. 16(a) are equal to the waveforms of the first display signal voltage and the second display signal voltage shown in FIG. 7. The polarity of the first display signal voltage SA1 supplied from the first source bus line SA and the polarity of the second display signal voltage SB1 supplied from the second source bus line SB are each constant within a frame. The polarity of the first display signal voltage SA1 supplied from the first source bus line SA and the polarity of the second display signal voltage SB1 supplied from the second source bus line SB are opposite to each other in a frame.

Thus, as previously described with reference to FIG. 7, when the first display signal voltage SA1 and the second display signal voltage SB1 shown in FIG. 16(a) are supplied to the liquid crystal display panel 10B (see FIG. 15) in which pixels and sub-pixels are arranged in the same way as in the liquid crystal display panel 10A shown in FIG. 2, the interval of polarity inversion of the display signal voltage is one frame, and dot inversion is realized in every frame. Therefore, the display quality can be improved while the power consumption is suppressed.

In this case, for example, when pixels of one pixel column exhibit an intermediate grayscale level and a grayscale level difference between sub-pixels is given to form bright sub-pixels and dark sub-pixels, bright sub-pixels which are electrically connected to the first source bus line SA and bright sub-pixels which are electrically connected to the second source bus line SB alternately occur in the pixel column. The first display signal voltage and the second display signal voltage are oscillating voltages whose amplitudes vary every horizontal scan period (1H). The period of the oscillation is 2H. That is, in each of the first display signal voltage and the second display signal voltage, the amplitude for the bright sub-pixel and the amplitude for the dark sub-pixel occur alternately every horizontal scan period.

When one of the source bus line pair (the source bus lines SA and SB) to which the first display signal voltage SA1 and the second display signal voltage SB1 which have the waveforms shown in FIG. 16(a) are to be output is disconnected and the disconnection is repaired using the spare wire AL1, the first display signal voltage SA2 and the second display signal voltage SB2 that have the waveforms shown in FIG. 16(b) are supplied instead of the first display signal voltage SA1 and the second display signal voltage SB1 shown in FIG. 16(a). That is, instead of the first and second display signal voltages output from the bright/dark division control circuit 20A, the first and second display signal voltages output from the bright/dark division control circuit 20B are output to the source bus line pair.

The amplitude of the oscillation of each of the first display signal voltage SA2 and the second display signal voltage SB2 shown in FIG. 16(b) is zero. Therefore, the multi-pixel driving is not performed on a pixel column which is associated with the repaired source bus line. Here, the largeness of the first display signal voltage SA2 of FIG. 16(b) (VA2 (+)) is equal to the time average of the largeness of the first display signal voltage SA1 of FIG. 16(a) (VA1(+)). The largeness of the second display signal voltage SB2 of FIG. 16(b) (VB2(−)) is equal to the time average of the largeness of the second display signal voltage SB1 of FIG. 16(a) (VB1(−)).

As described above as to the liquid crystal display device 100A of the previous embodiment with reference to FIG. 3, maximizing the grayscale level difference between sub-pixels in the multi-pixel driving is preferred. The first display signal voltage and the second display signal voltage which have equal voltage values to the time averages of the first display signal voltage and the second display signal voltage that have oscillatory waveforms for the multi-pixel driving (for example, the first display signal voltage SA1 and the second display signal voltage SB1 of FIG. 16(a)) and which do not oscillate (which are DC voltages for at least one frame period), for example, the first display signal voltage SA2 and the second display signal voltage SB2 of FIG. 16(b), are set so as to have a grayscale level-luminance characteristic represented by a chain dot line in FIG. 17, for example. The grayscale level vs. luminance characteristic represented by a chain dot line in FIG. 17 is a characteristic obtained by just averaging (halving) the grayscale level vs. luminance characteristic of the bright sub-pixel (solid line) and the grayscale level vs. luminance characteristic of the dark sub-pixel (broken line).

As will be described in the following section with reference to FIG. 18 to FIG. 20, it is preferred that the first and second display signal voltages output to a source bus line pair which includes a source bus line repaired with the use of the spare wire AL1 have non-oscillatory waveforms (the amplitudes of the oscillation of the first and second display signal voltages are zero).

Figure 18:
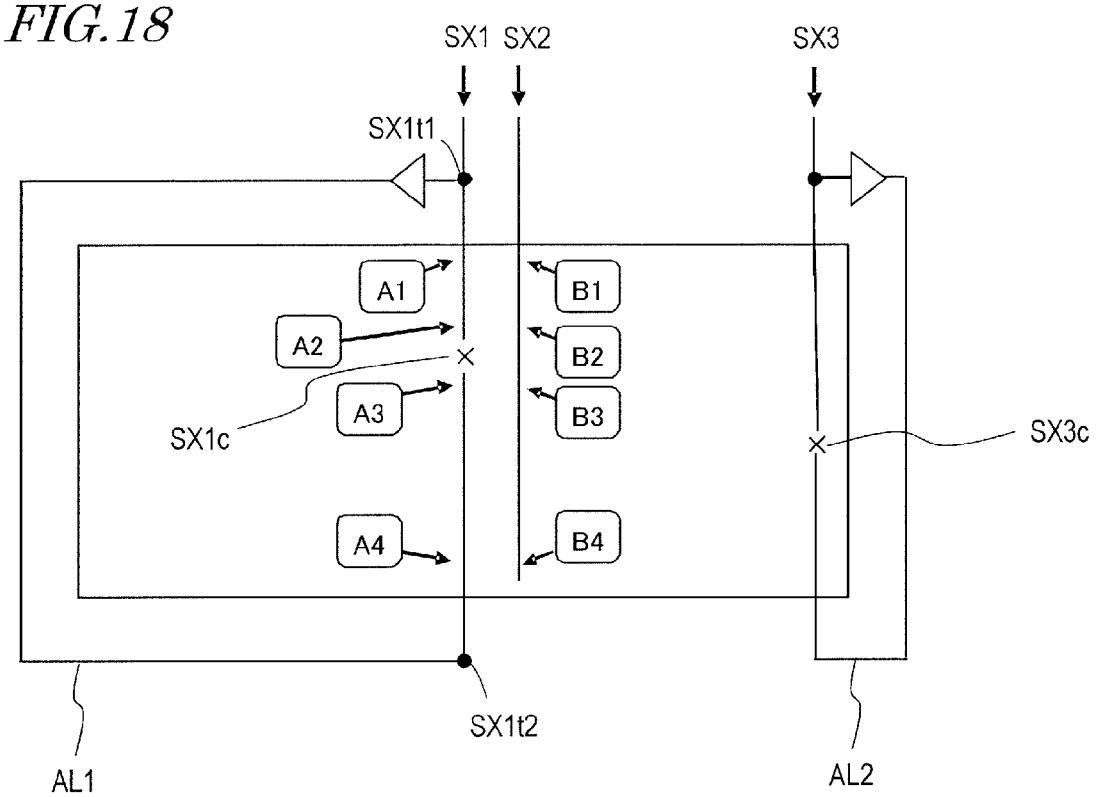
FIG. 18 A schematic diagram of a liquid crystal display panel for illustrating a problem which occurs when a display signal voltage that has the same oscillatory waveform as that supplied to a normal source bus line SX2 is supplied to the disconnection-repaired source bus line SX1.
Figure 19:
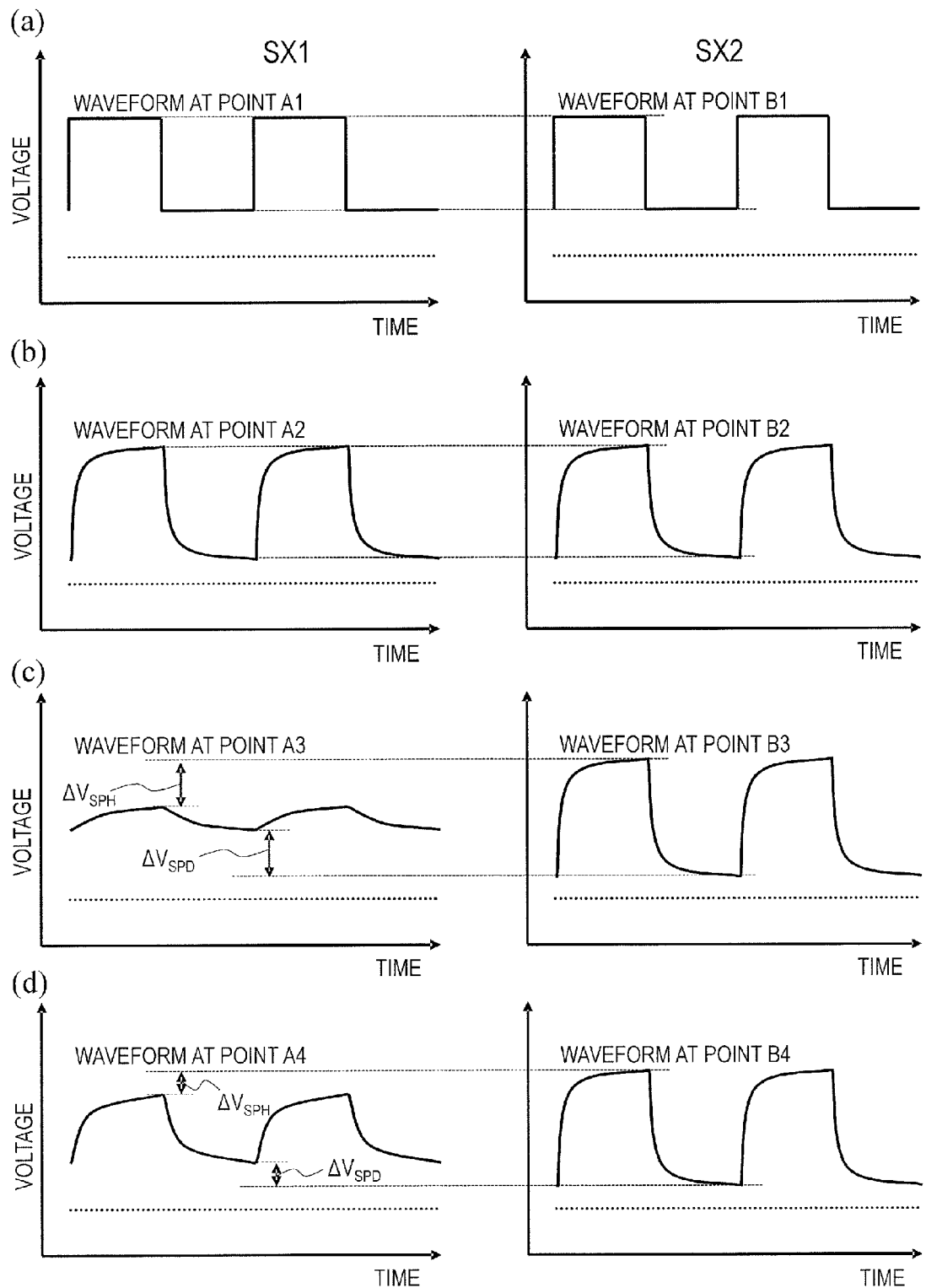
FIG. 19 (a) to (d) show the voltage waveforms at points A1 to A4 on the source bus line SX1 and at points B1 to B4 on the source bus line SX2 shown in FIG. 18 which are achieved when a display signal voltage that has the same oscillatory waveform as that supplied to a normal source bus line is supplied to the disconnection-repaired source bus line SX1.

As shown in FIG. 18, among three source bus lines SX1, SX2 and SX3 which are associated with different pixel columns, the source bus line SX1 has a disconnection at a position SX1c, and the source bus line SX3 has a disconnection at a position SX3c. The source bus line SX1 is electrically connected to a spare wire AL1 at two positions SX1t1 and SX1t2, whereby the disconnection is repaired. In the source bus line SX3 also, the disconnection is repaired likewise using a spare wire AL2.

Here, the source bus lines SX1, SX2 and SX3 are first source bus lines SA which are associated with three different pixel columns. The other source bus lines of source bus line pairs that include the source bus lines SX1, SX2 and SX3 are second source bus lines SB. The display signal voltage supplied via the second source bus lines SB has an oscillatory waveform which is equal to the display signal voltage SB2 shown in FIG. 16(b), for example, and the multi-pixel driving is performed on the pixel columns with which they are associated. Also, the three different pixel columns with which the source bus lines SX1, SX2 and SX3 are associated are to exhibit the same intermediate grayscale level.

FIGS. 19(a) to 19(d) show the voltage waveforms at points A1 to A4 on the source bus line SX1 and at points B1 to B4 on the source bus line SX2 shown in FIG. 18. Here, problems are described which occur when a display signal voltage that has the same oscillatory waveform as that supplied to a normal source bus line is supplied as the display signal voltage to a source bus line SX1 in which disconnection is repaired with the use of the spare wire AL1.

As shown in FIG. 19(a), a display signal voltage which has a predetermined oscillatory waveform is supplied to both point A1 on the disconnection-repaired source bus line SX1 and point B1 on the normal source bus line SX2.

In comparison, as shown in FIGS. 19(b) to 19(d), the dullness of the oscillatory waveforms at point A2 through point A4 on the disconnection-repaired source bus line SX1 are increases as the length of the transmission path of the display signal voltage increases. The oscillatory waveforms at point B2 through point B4 on the normal source bus line SX2 are somewhat dull due to CR of the source bus line SX2, the pixels, etc., but the predetermined oscillatory waveform is maintained.

As seen from FIGS. 19(c) and 19(d), the amplitude of the display signal voltage on the disconnection-repaired source bus line SX1 is smaller than that of the display signal voltage on the normal source bus line SX2. As a result, the voltage which is to be supplied to the bright sub-pixels of a pixel column associated with the disconnection-repaired source bus line SX1 decreases by $\Delta V_{SPH}$, and the voltage which is to be supplied to the dark sub-pixels of the pixel column increases by $\Delta V_{SPD}$. The magnitude of the decrease and increase of these voltages depends on the length (CR) of the transmission path of the display signal. Thus, so long as the display signal voltage has an oscillatory waveform, the degree of the dullness of the oscillatory waveform varies depending on the position of the pixel (the length of the transmission path), and therefore, $\Delta V_{SPH}$ and $\Delta V_{SPD}$ cannot be zero in all of the pixels.

When a source bus line at a position close to a spare wire AL2 is electrically connected to the spare wire AL2 as is the source bus line SX3, the length of the transmission path increased due to that connection is much smaller than that obtained when the source bus line SX1 is electrically connected to the spare wire AL1. Therefore, the dullness of the oscillatory waveform of the display signal voltage in the source bus line SX3 is much smaller than the dullness of the oscillatory waveform of the display signal voltage in the source bus line SX1. Thus, the degree of the dullness of the oscillatory waveform of the display signal voltage also varies depending on the position on the source bus line at which disconnection is repaired.

In view of the above, in the liquid crystal display device 100B of the present embodiment, for example, as shown in FIG. 20, a display signal voltage which has an oscillatory waveform whose amplitude is zero (DC waveform, non-oscillatory waveform) is supplied to the disconnection-repaired source bus line SX1. Thus, a display signal voltage which has the waveform shown in FIG. 20(b) can be supplied at all of points A2 to A4, without depending on the length of the transmission path. In this case, it is preferred that the largeness of the display signal voltage is equal to the time average of the oscillatory waveform of the display signal voltage supplied to the normal source bus line SX2 as shown in FIG. 20(b). Accordingly, a pixel associated with the disconnection-repaired source bus line SX1 exhibits a luminance equal to that exhibited by a pixel associated with the normal source bus line. As a matter of course, in this case, the multi-pixel driving is not performed on the pixel associated with the disconnection-repaired source bus line SX1, and therefore, the effect of improving the viewing angle dependence of the gamma characteristic and the color reproducibility is not achieved. However, such occurs only in a few pixel columns among a large number of pixel columns, and it would not provide such an effect that deteriorates the display quality. Rather, the effect of preventing the pixel column from being visually perceived as a bright line which would occur when the luminance is higher than those of the other pixel columns and the effect of preventing the pixel column from being visually perceived as a dark line which would occur when the luminance is lower than those of the other pixel columns are greater.

Specific examples of the operation of the bright/dark division control circuits 20A and 20B are described with reference to FIG. 21.

When the input grayscale levels to the R pixel, the G pixel and the B pixel are 180/255, 120/255 and 80/255, respectively, as shown in FIG. 21(a), for the purpose of reducing the viewing angle dependence of the color reproducibility, the bright/dark division control circuit 20A generates and outputs the display signal voltage such that the multi-pixel driving is not performed on the R pixel while the grayscale level difference between sub-pixels is the maximum in the other two pixels, as does the bright/dark division control circuit 20 of the liquid crystal display device 100A of the previous embodiment.

On the other hand, the bright/dark division control circuit 20B of the liquid crystal display device 100B of the present embodiment is capable of generating and outputting the display signal voltage such that, for a disconnection-repaired source bus line, the multi-pixel driving is not performed irrespective of the color of the pixel (the grayscale level difference between sub-pixels is zero) as shown in FIG. 21(b).

The bright/dark division control circuit 20B is capable of generating and outputting the display signal voltage such that the multi-pixel driving is not performed when the disconnection-repaired source bus line is associated with the R pixel and the grayscale level difference between sub-pixels is reduced when the disconnection-repaired source bus line is associated with the G pixel or the B pixel as shown in FIG. 21(c).

Note that, whether to use an oscillatory waveform which has a small amplitude or a non-oscillatory waveform (an oscillatory waveform whose amplitude is zero) as the display signal voltage which is to be output to a source bus line pair which includes a repaired source bus line may be determined depending on the color to be displayed. Here, "depending on the color to be displayed" means considering the relationship between the color which is to be displayed in a region including a pixel column associated with the repaired source bus line and the color which is to be displayed by the pixel column associated with the repaired source bus line. When a shift in luminance in the pixel column associated with the repaired source bus line is conspicuous, using a non-oscillatory waveform as the display signal voltage which is to be output to the source bus line pair which includes the repaired source bus line is preferred.

For example, the grayscale level of a pixel associated with the repaired source bus line and the grayscale levels of two neighborhood pixels at opposite sides of that pixel are compared. When the grayscale level of the pixel associated with the repaired source bus line is higher than the grayscale levels of the two neighborhood pixels, a non-oscillatory waveform may be used. In the case where the pixel associated with the repaired source bus line is a G pixel, the two neighborhood pixels are R and B pixels, these pixels constitute a sequence of a color display pixel, and the entirety of the display region displays an intermediate tone of green (for example, the grayscale level of the G pixel is 100/255 and the grayscale level of the R and B pixels is 0/255), the G pixel column that is associated with the repaired source bus line is conspicuous. In this case, using a non-oscillatory waveform as the display signal voltage which is to be output to the source bus line pair which includes the repaired source bus line is preferred.

The arrangement of pixels P and sub-pixels SP1, SP2 in the liquid crystal display device 100B is not limited to those shown in FIG. 2 and FIG. 15. However, as shown in FIG. 2 and FIG. 15, it is preferred that two sub-pixels which belong to two pixels adjacent to each other in the column direction and which are electrically connected to one source bus line are adjacent to each other in the column direction. The reasons for this preferred arrangement are described with reference to FIG. 22 and FIG. 23.

Figure 22:
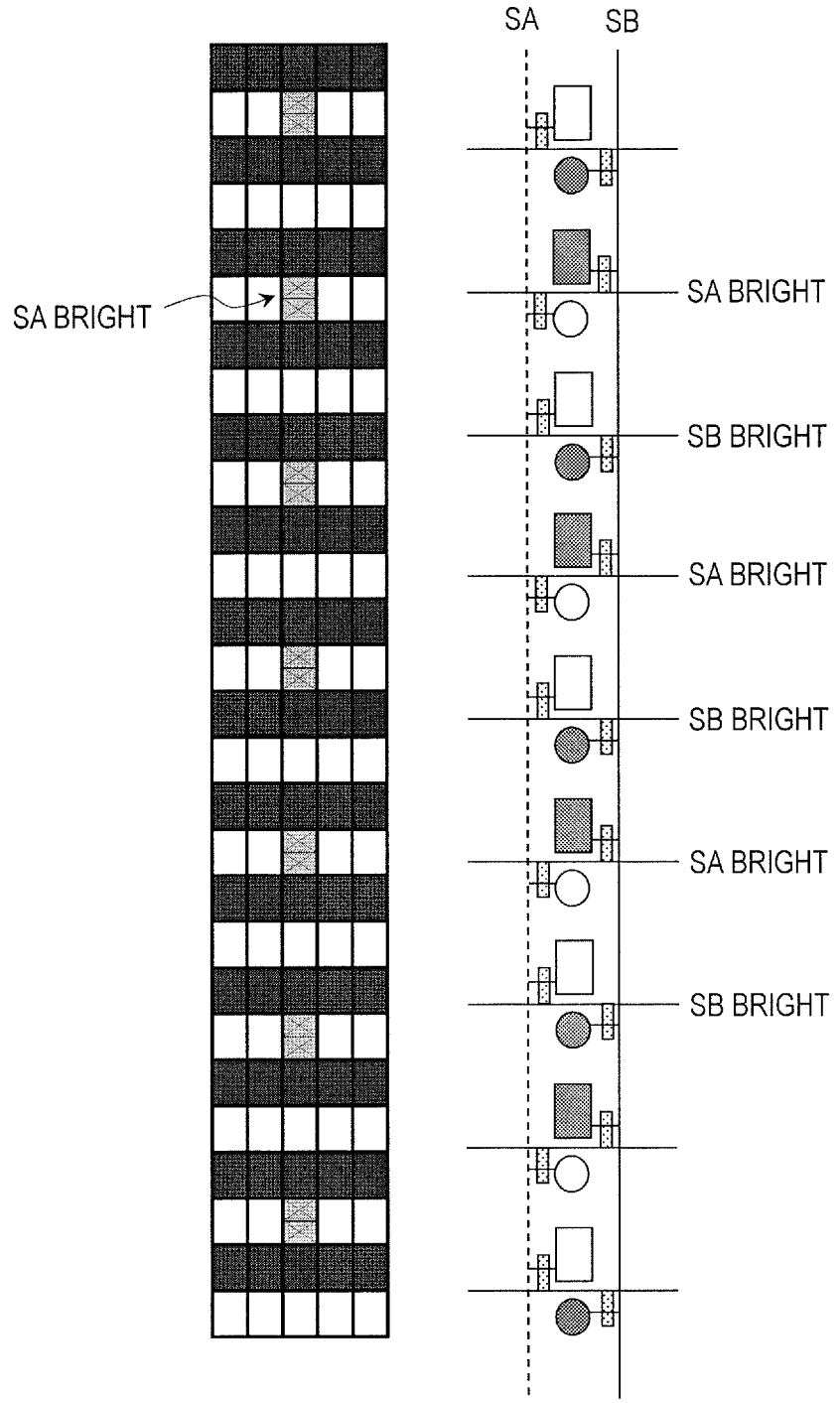
FIG. 22 A diagram showing an example of the pixel arrangement in a liquid crystal display device according to an embodiment of the present invention.

FIG. 22 shows a case where disconnection in a source bus line SA associated with one pixel column is repaired. The pixels shown in FIG. 22 are arranged such that two sub-pixels which belong to two pixels adjacent to each other in the column direction and which are electrically connected to one source bus line are adjacent to each other in the column direction, in the same way as those shown in FIG. 2 and FIG. 15. In other words, when discussed in terms of the bright sub-pixels, bright sub-pixels connected to the source bus line SA and bright sub-pixels connected to the source bus line SB occur alternately in the column direction. Therefore, even when the luminance of the sub-pixels connected to the disconnection-repaired source bus line SA is somewhat low, the variation in luminance is unlikely to be visually perceived because these sub-pixels are dispersedly arranged.

Figure 23:
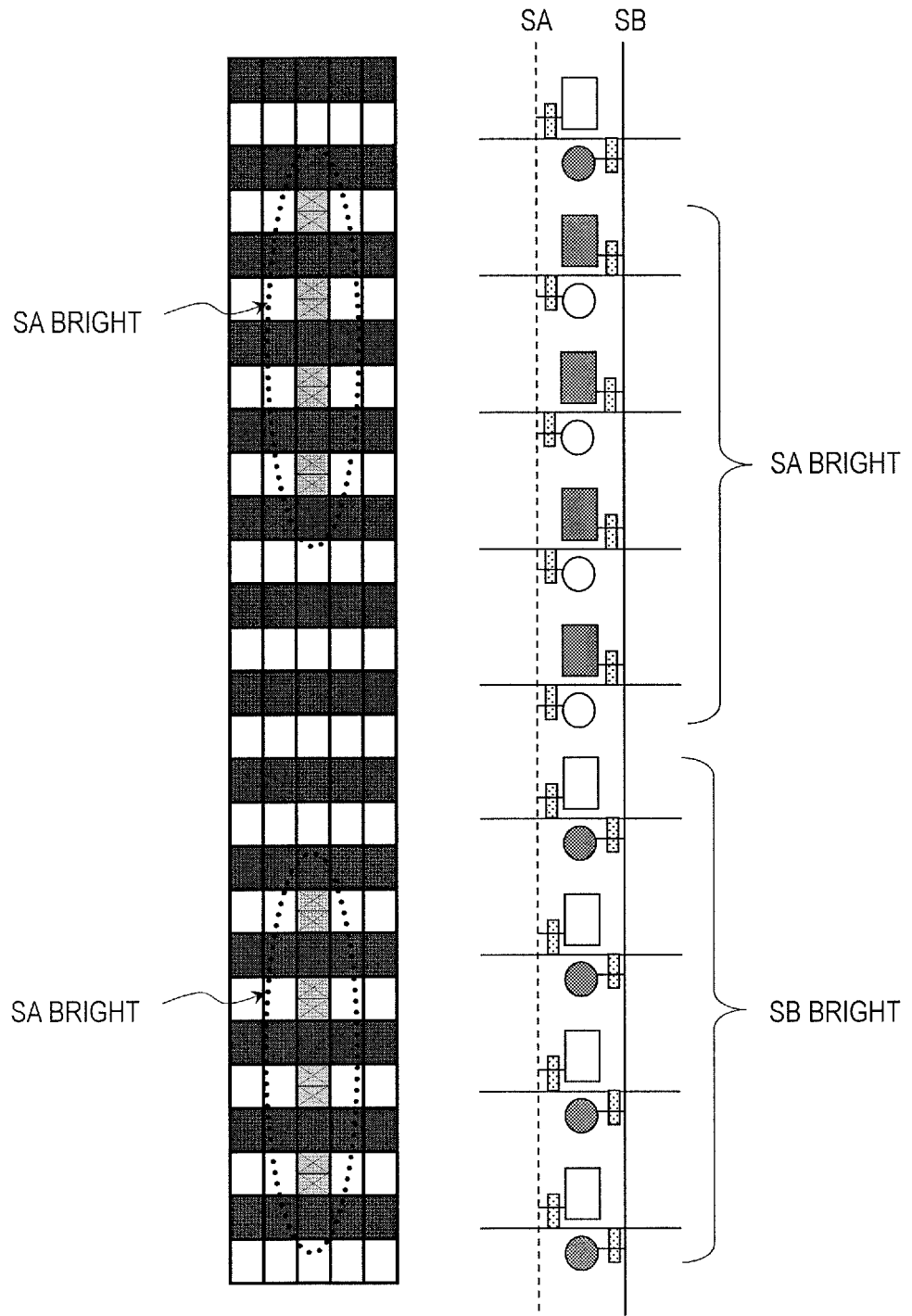
FIG. 23 A diagram showing another example of the pixel arrangement in a liquid crystal display device according to an embodiment of the present invention.

On the other hand, when bright sub-pixels connected to the source bus line SA and bright sub-pixels connected to the source bus line SB are in a block arrangement as shown in FIG. 23, the difference in luminance is more likely to be visually perceived. Therefore, this arrangement is not preferred.

Figure 24:
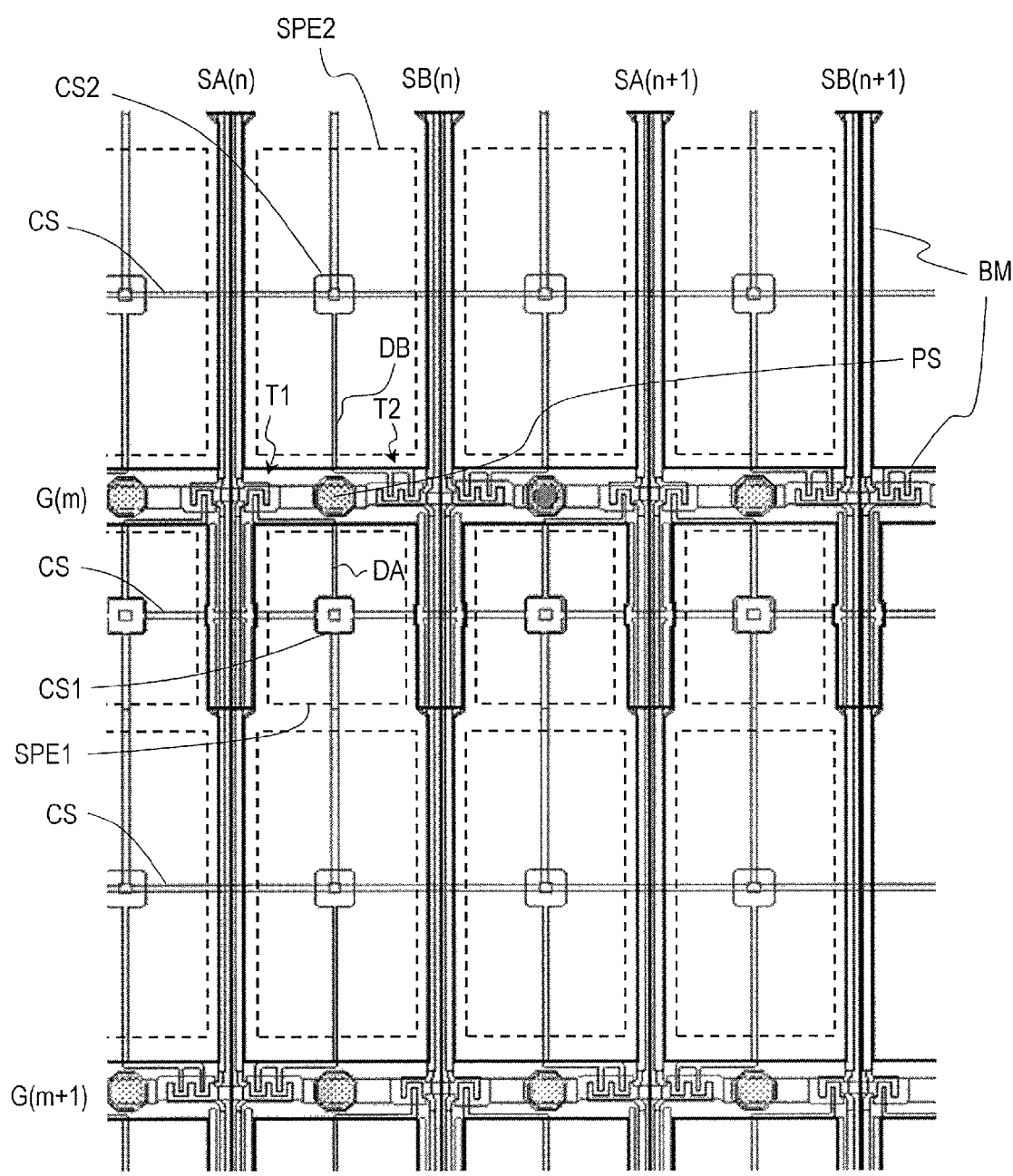
FIG. 24 A schematic plan view showing a specific configuration example of pixels of a liquid crystal display device according to an embodiment of the present invention.
Figure 25:
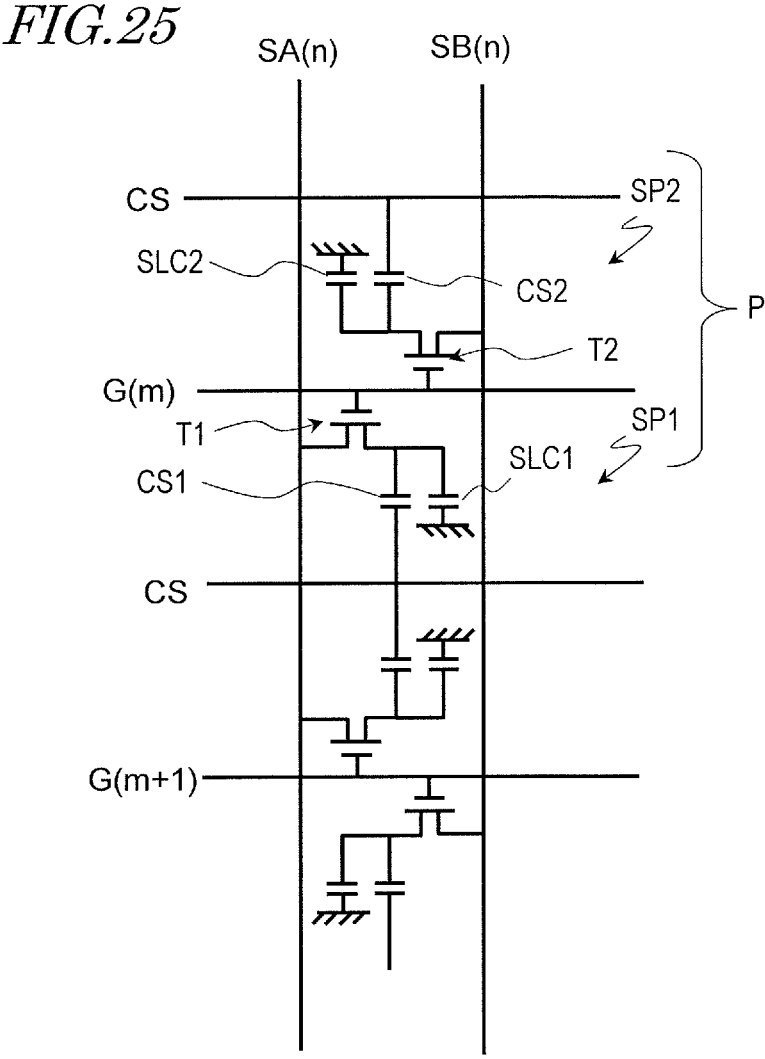
FIG. 25 An equivalent circuit diagram of a pixel shown in FIG. 24.

A specific example of the configuration of the liquid crystal display panel 10A (see FIG. 2) of the liquid crystal display device 100A of the above-described embodiment is described with reference to FIG. 24 and FIG. 25. FIG. 24 is schematic plan view of the liquid crystal display panel. FIG. 25 is an equivalent circuit diagram.

A configuration corresponding to the pixels P(m, n) of the liquid crystal display panel 10A shown in FIG. 2 is described with reference to FIG. 24. The liquid crystal display panel typically includes a pair of substrates and a liquid crystal layer interposed between the pair of substrates. One of the pair of substrates (e.g., TFT substrate) includes a glass substrate, pixel electrodes (sub-pixel electrodes) provided on the glass substrate, TFTs, and circuit elements such as various bus lines. The other substrate (e.g., color filter substrate) includes a glass substrate, a counter electrode (common electrode) provided on the glass substrate, a color filter, and a black matrix. In FIG. 24, for the sake of simplicity, among the components of the counter substrate, only the black matrix BM is shown, while the counter electrode, the color filter, etc., are omitted. Bold solid lines extending along the gate bus line and the source bus line in FIG. 24 represent the outline of the black matrix BM.

Pixel P(m, n) includes the first sub-pixel electrode SPE1 and the second sub-pixel electrode SPE2. That is, the first sub-pixel SP1 and the second sub-pixel SP2 shown in FIG. 2 are demarcated by the first sub-pixel electrode SPE1 and the second sub-pixel electrode SPE2, respectively. The first sub-pixel electrode SPE1 is connected to the drain electrode of the first TFT T1 via a drain connection wire DA. The second sub-pixel electrode SPE2 is connected to the drain electrode of the second TFT T2 via a drain connection wire DB. The first TFT T1 and the second TFT T2 are switched by a scan signal supplied from a common gate bus line G(m). In a period where the first TFT T1 and the second TFT T2 are kept ON by the scan signal, the first display signal voltage and the second display signal voltage are supplied from the first source bus line SA(n) and the second source bus line SB(n) to the first sub-pixel electrode SPE1 and the second sub-pixel electrode SPE2, respectively.

The liquid crystal display panel includes the first sub-pixel electrodes SPE1, the second sub-pixel electrodes SPE2, and a counter electrode (not shown) arranged to oppose the electrodes SPE1 and SPE2 via a liquid crystal layer (not shown). The first sub-pixel electrodes SPE1, the counter electrode, and the liquid crystal layer lying between the first sub-pixel electrodes SPE1 and the counter electrode constitute the first sub-pixels SP1. The second sub-pixel electrodes SPE2, the counter electrode, and the liquid crystal layer lying between the second sub-pixel electrodes SPE2 and the counter electrode constitute the second sub-pixels SP2. In the equivalent circuit diagram shown in FIG. 25, the first sub-pixel electrode SPE1, the counter electrode, and the liquid crystal layer lying between the first sub-pixel electrode SPE1 and the counter electrode constitute the first liquid crystal capacitance SLC1. The second sub-pixel electrode SPE2, the counter electrode, and the liquid crystal layer lying between the second sub-pixel electrode SPE2 and the counter electrode constitute the second liquid crystal capacitance SLC2. The first liquid crystal capacitance SLC1 and the second liquid crystal capacitance SLC2 are electrically connected in parallel with the first storage capacitance CS1 and the second storage capacitance CS2, respectively. The first storage capacitance CS1 and the second storage capacitance CS2 are each constituted of a drawn out portion of a CS bus line CS, a drawn out portion of a drain extension wire DA or DB, and an insulating layer (e.g., gate insulating layer) interposed between these portions as shown in FIG. 24.

Such a liquid crystal display panel can be manufactured according to a known method. The type of the liquid crystal layer is not particularly limited but may be, for example, a vertical alignment liquid crystal layer as described above.

INDUSTRIAL APPLICABILITY

A liquid crystal display device of an embodiment of the present invention is applicable to a wide variety of uses in which the color reproducibility is demanded.

REFERENCE SIGNS LIST

10A, 10B liquid crystal display panel
15A, 15B control circuit

20, 20A, 20B bright/dark division control circuit
22R, 22G, 22B primary color bright/dark division control circuit
22RA, 22GA, 22BA, 22RB, 22 GB, 22BB primary color bright/dark division control circuit
100A, 100B liquid crystal display device

The invention claimed is:

1. A liquid crystal display device, comprising:
  a plurality of pixels arranged in a matrix of rows and columns, each of the plurality of pixels including a first sub-pixel and a second sub-pixel;
  a first TFT and a second TFT which are associated with each of the plurality of pixels;
  a first source bus line connected to the first sub-pixel via the first TFT and a second source bus line connected to the second sub-pixel via the second TFT;
  a spare wire which is electrically connectable with the first source bus line and/or the second source bus line; and
  a control circuit configured to receive an input display signal that is indicative of grayscale levels which are to be exhibited by the plurality of pixels, generate a first display signal voltage and a second display signal voltage which are to be supplied to the first sub-pixel and the second sub-pixel of each of the plurality of pixels, and output the generated first and second display signal voltages to the first source bus line and the second source bus line, respectively,
  wherein when the first source bus line or the second source bus line which is associated with a pixel of one column is electrically connected with the spare wire, the control circuit is capable of controlling amplitudes of oscillation of the first display signal voltage and the second display signal voltage output to the first source bus line and the second source bus line associated with the pixel of the one column so as to be smaller than that achieved when the first source bus line or the second source bus line associated with the pixel of the one column is not electrically connected with the spare wire.

2. The liquid crystal display device of claim 1, wherein when the first source bus line or the second source bus line which is associated with the pixel of the one column is electrically connected with the spare wire, the control circuit is capable of controlling the amplitudes of the oscillation of the first display signal voltage and the second display signal voltage output to the first source bus line and the second source bus line associated with the pixel of the one column so as to be zero.

3. The liquid crystal display device of claim 1, wherein the plurality of pixels form a plurality of color display pixels, each of the plurality of color display pixels including three or more pixels which exhibit different colors, and
when the first source bus line or the second source bus line which is associated with the pixel of the one column is electrically connected with the spare wire, the control circuit is capable of changing the amplitude of the oscillation of the first display signal voltage or the second display signal voltage according to a color which is to be exhibited by the pixel of the one column.

4. The liquid crystal display device of claim 1, wherein the plurality of pixels form a plurality of color display pixels, each of the plurality of color display pixels including three or more pixels which exhibit different colors, and the control circuit is capable of generating a first display signal voltage and a second display signal voltage that are to be supplied to the first sub-pixel and the second sub-pixel of an arbitrary one of the plurality of pixels based on a grayscale level to be exhibited by the arbitrary pixel and grayscale levels to be exhibited by two or more remaining pixels included in a color display pixel to which the arbitrary pixel belongs that are indicated by the input display signal, and outputting the generated first and second display signal voltages to the first source bus line and the second source bus line, respectively.

5. The liquid crystal display device of claim 4, wherein for one grayscale level which is to be exhibited by the arbitrary pixel, the control circuit is capable of generating the first display signal voltage and the second display signal voltage that have two or more different absolute values according to the grayscale levels to be exhibited by the two or more remaining pixels.

6. The liquid crystal display device of claim 4, wherein
the first source bus line and the second source bus line extend in the column direction,
in each of the plurality of pixels, the first sub-pixel and the second sub-pixel are arranged in the column direction, and
a polarity of the first display signal voltage supplied from the first source bus line and a polarity of the second display signal voltage supplied from the second source bus line are each constant within a frame.

7. The liquid crystal display device of claim 6, wherein the polarity of the first display signal voltage supplied from the first source bus line and the polarity of the second display signal voltage supplied from the second source bus line are opposite to each other in a frame.

8. The liquid crystal display device of claim 6, wherein
some of the plurality of pixels which are arranged in the column direction are to exhibit a same color, and
two sub-pixels which belong to two pixels adjacent to each other in the column direction and which are electrically connected to the first source bus line are adjacent to each other in the column direction.

9. The liquid crystal display device of claim 1, wherein the first TFT and the second TFT include a semiconductor oxide layer as an active layer, the semiconductor oxide layer including an In—Ga—Zn—O semiconductor.

10. The liquid crystal display device of claim 9, wherein the In—Ga—Zn—O semiconductor includes a crystalline portion.

* * * * *